United States Patent
Manson

(10) Patent No.: US 7,085,708 B2
(45) Date of Patent: Aug. 1, 2006

(54) COMPUTER SYSTEM WITH NATURAL LANGUAGE TO MACHINE LANGUAGE TRANSLATOR

(75) Inventor: Keith S. Manson, Albany, CA (US)

(73) Assignee: Ravenflow, Inc., Emeryville, CA (US)

( * ) Notice: Subject to any disclaimer, the term of this patent is extended or adjusted under 35 U.S.C. 154(b) by 1095 days.

(21) Appl. No.: 09/883,693

(22) Filed: Jun. 18, 2001

(65) Prior Publication Data

US 2004/0181390 A1   Sep. 16, 2004

Related U.S. Application Data

(60) Provisional application No. 60/235,165, filed on Sep. 23, 2000.

(51) Int. Cl.
G06F 17/27 (2006.01)

(52) U.S. Cl. .............................. 704/9; 704/1
(58) Field of Classification Search .................. 704/9
See application file for complete search history.

(56) References Cited

U.S. PATENT DOCUMENTS

| 5,321,608 A | * | 6/1994 | Namba et al. ................. 704/9 |
| 5,555,169 A | * | 9/1996 | Namba et al. ................. 704/9 |
| 5,682,539 A | * | 10/1997 | Conrad et al. ................. 704/9 |
| 5,878,385 A |   | 3/1999 | Bralich et al. |
| 5,884,302 A | * | 3/1999 | Ho ................................. 707/3 |
| 5,966,686 A |   | 10/1999 | Heidorn et al. |
| 6,029,123 A |   | 2/2000 | Suda et al. |
| 6,070,134 A |   | 5/2000 | Richardson et al. |
| 6,108,620 A |   | 8/2000 | Richardson et al. |
| 6,311,150 B1 | * | 10/2001 | Ramaswamy et al. ......... 704/1 |

OTHER PUBLICATIONS

Pereira, Categorial Semantics and Scoping (1990) Computations Linguistics V.1, p. 1-10.*
Uchinami et al., Linguistic model based on the generative topological information space, Osaka University (1980), p. 93-100.*
Warren et al., Using Semantics in Non-Context-Free Parsing of Montague Grammar, 1982, Ameican Journal of Computational Linguistics, V.8, No. 3-4, Jul.-Dec. 1982, p. 123-138.*

* cited by examiner

Primary Examiner—Richemond Dorvil
Assistant Examiner—Lamont Spooner
(74) Attorney, Agent, or Firm—John Carpenter; Reed Smith, LLP

(57) ABSTRACT

Presented is a system and method for converting or translating expressions in a natural language such as English into machine executable expressions in a formal language. This translation enables a transformation from the syntactic structures of a natural language into effective algebraic forms for further exact processing. The invention utilizes algorithms employing a reduction of sequences of terms defined over an extensible lexicon into formal syntactic and semantic structures. This term reduction incorporates both syntactic type and semantic context to achieve an effective formal representation and interpretation of the meaning conveyed by any natural language expression.

9 Claims, 7 Drawing Sheets

General System Process and Data Flow

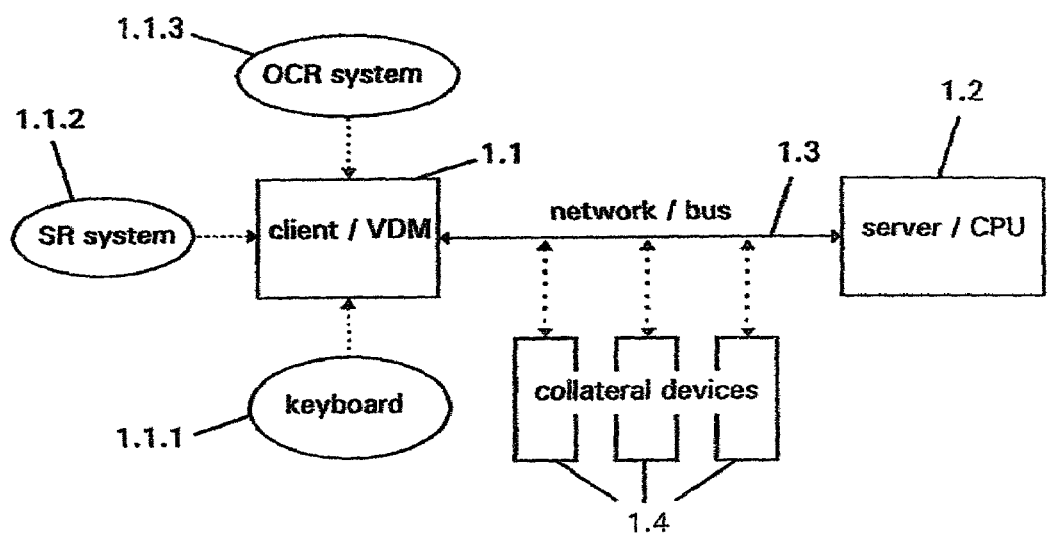
Figure 1: Computer System Architecture

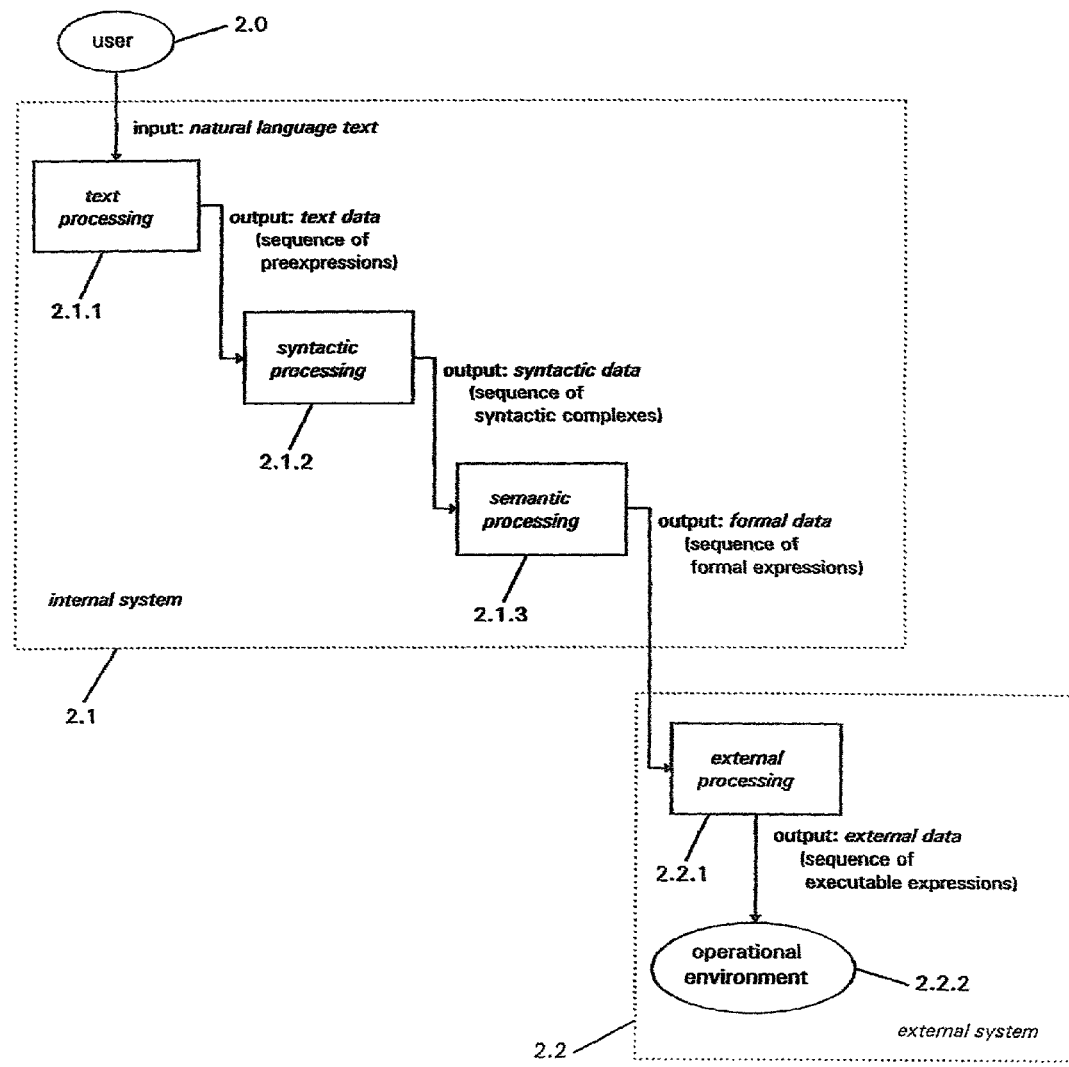
Figure 2: General System Process and Data Flow

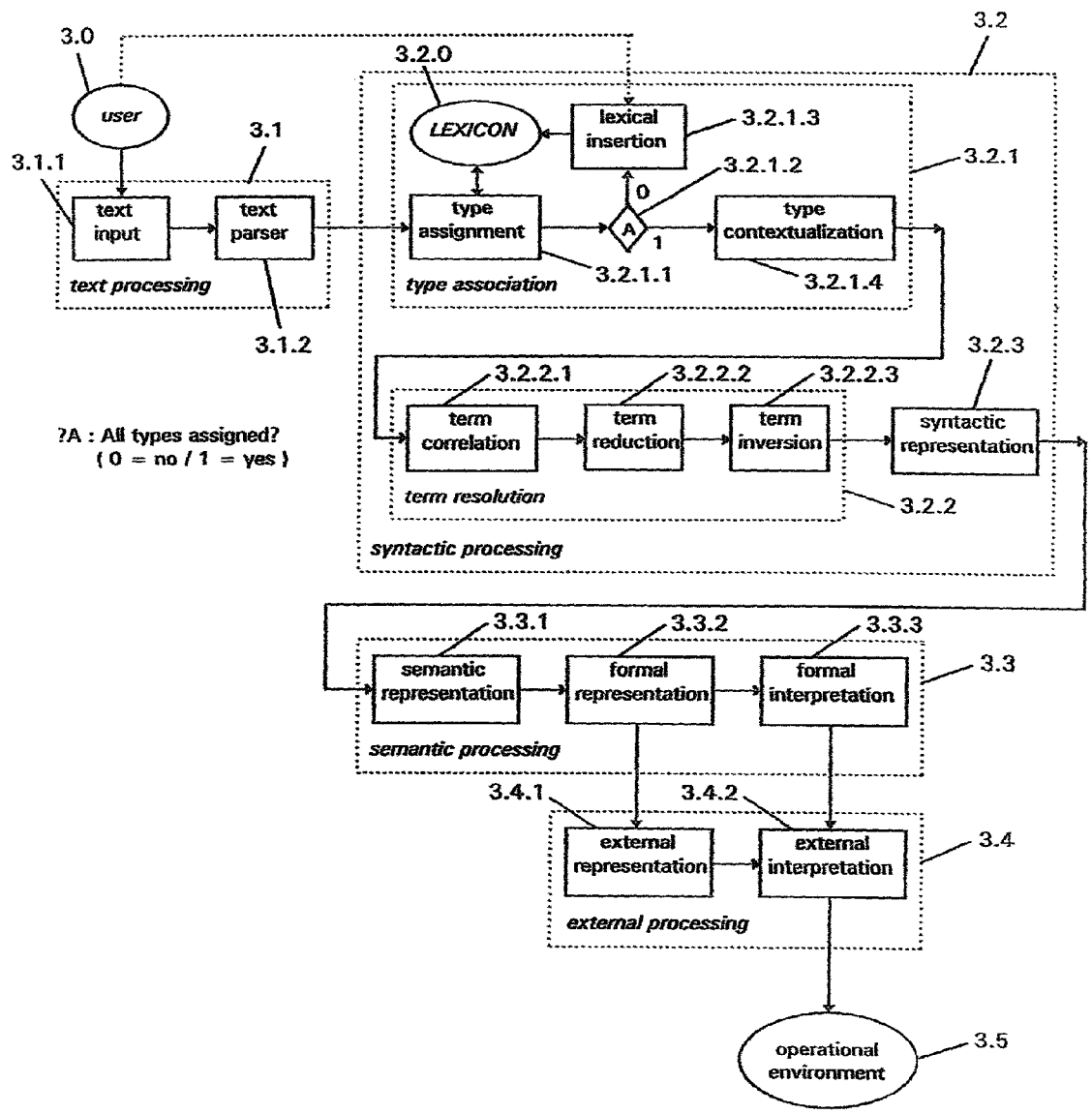
Figure 3: Detailed System Process and Data Flow

```
0) (send,act)       = (send,lextyp(0,send));              act = action
1) (Bob,pnm)        = (Bob,lextyp(0,Bob));                pnm = proper name/male
2) (an,adj)         = (an,lextyp(0,an));                  adj = adjective
3) (email,xao)      = (email,lextyp(0,email));            xao = ambiguous action/object
4) (asking,ing)     = (asking,lextyp(0,asking));          ing = ambiguous participle/gerund
5) (him,ppm)        = (him,lextyp(0,him));                ppm = personal pronoun/male
6) (if,xdc)         = (if,lextyp(0,if));                  xdc = ambiguous delimiter/conditional
7) (he,ppm)         = (he,lextyp(0,he));                  ppm = personal pronoun/male
8) (is,sob)         = (is,lextyp(0,is));                  sob = state-of-being verb
9) (going,ing)      = (going,lextyp(0,going));            ing = ambiguous participle/gerund
10) (to,xpi)        = (to,lextyp(0,to));                  xpi = ambiguous preposition/infinitive
11) (go,act)        = (go,lextyp(0,go));                  act = action
12) (to,xpi)        = (to,lextyp(0,to));                  xpi = ambiguous preposition/infinitive
13) (his,psm)       = (his,lextyp(0,his));                psm = personal possessive/male
14) (appointment,xom) = (appointment,lextyp(0,appointment));
                                                          xom = ambiguous object/modifier
15) (by,prp)        = (by,lextyp(0,by));                  prp = preposition
16) (himself,prm)   = (himself,lextyp(0,himself));        prm = personal reflexive/male
17) (.,trm)         = (.,lextyp(0,.));                    trm = termination
```

Figure 4a: Virtual Type Assignment

```
0) (send,act)       = (send,lextyp(0,send));              act = action
1) (Bob,pnm)        = (Bob,lextyp(0,Bob));                pnm = proper name/male
2) (an,adj)         = (an,lextyp(0,an));                  adj = adjective
3) (email,obj)      = (email,lextyp(1,email));            obj = object
4) (asking,ptc)     = (asking,lextyp(1,asking));          ptc = participle
5) (him,ppm)        = (him,lextyp(0,him));                ppm = personal pronoun/male
6) (if,dlp)         = (if,lextyp(0,if));                  dlp = phrase delimiter
7) (he,ppm)         = (he,lextyp(0,he));                  ppm = personal pronoun/male
8) (is,sob)         = (is,lextyp(0,is));                  sob = state-of-being verb
9) (going,ptc)      = (going,lextyp(1,going));            ptc = participle
10) (to,inf)        = (to,lextyp(2,to));                  inf = infinitive
11) (go,act)        = (go,lextyp(0,go));                  act = action
12) (to,prp)        = (to,lextyp(1,to));                  prp = preposition
13) (his,psm)       = (his,lextyp(0,his));                psm = personal possessive/male
14) (appointment,obj) = (appointment,lextyp(1,appointment));
                                                          obj = object
15) (by,prp)        = (by,lextyp(0,by));                  prp = preposition
16) (himself,prm)   = (himself,lextyp(0,himself));        prm = personal reflexive/male
17) (.,trm)         = (.,lextyp(0,.));                    trm = termination
```

Figure 4b: Actual Type Assignment

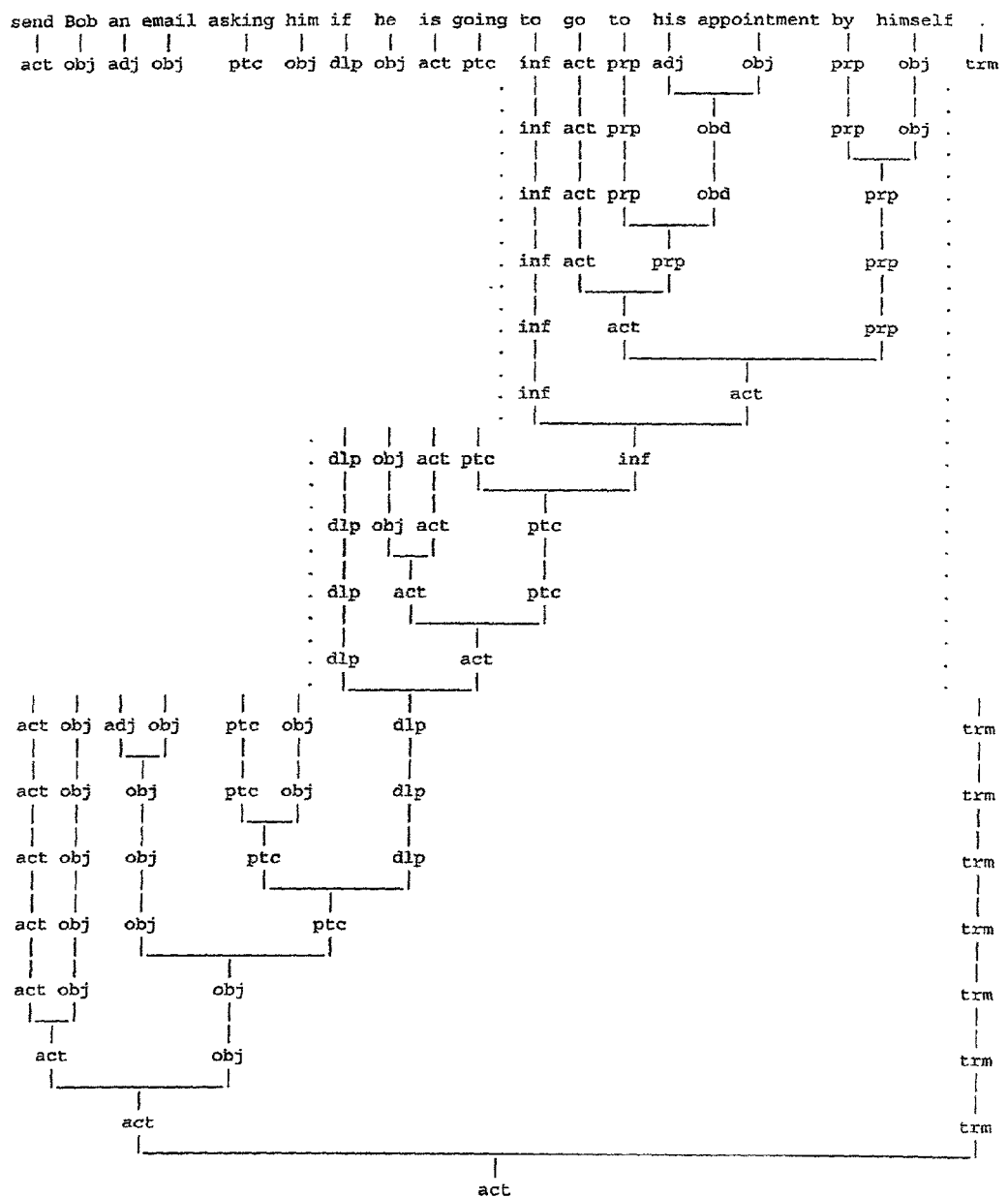
Figure 5: Term Reduction Sequence 0) (send,act) → (Bob,obi)

1) (send,act) → (email,obd) → (an,adj)

2) (send,act) → (email,obd) → (asking,ptc) → (him,obd)

3) (send,act) → (email,obd) → (asking,ptc) → (if,dlp) → (is,act) → (he,obs)

4) (send,act) → (email,obd) → (asking,ptc) → (if,dlp) → (is,act) → (going,ptc) → (to,inf) → (go,act) → (to,prp) → (appointment,obp) → (his,adj)

5) (send,act) → (email,obd) → (asking,ptc) → (if,dlp) → (is,act) → (going,ptc) → (to,inf) → (go,act) → (by,prp) → (himself,obp)

Figure 6a: Syntactic Dependency Chains

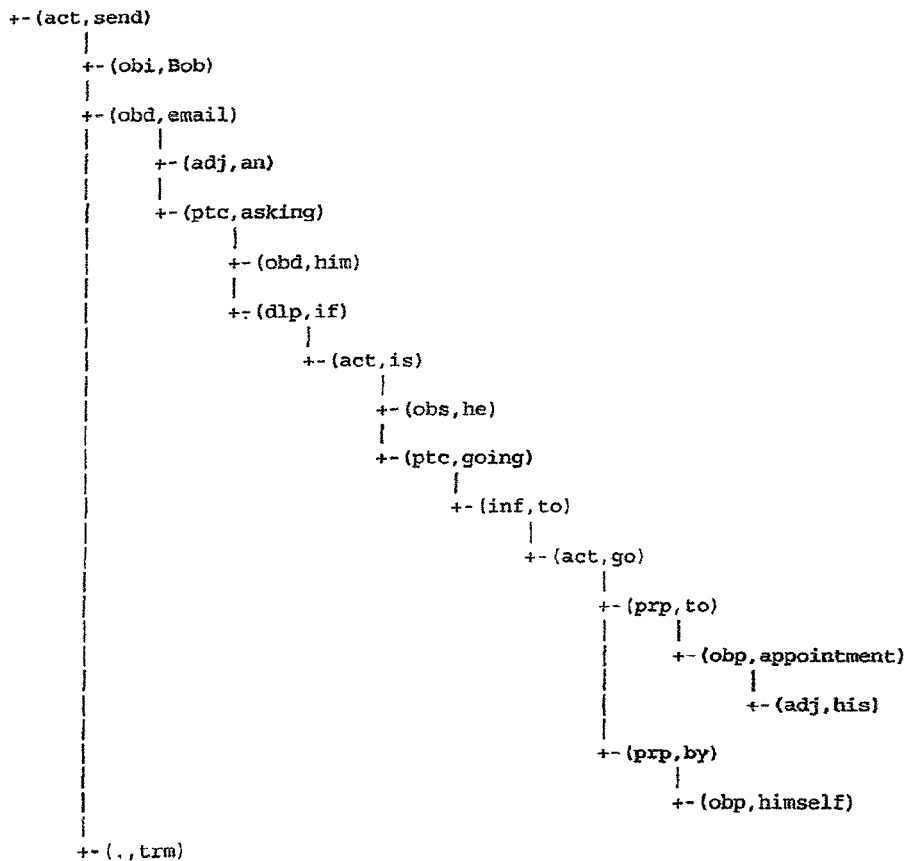

```
+-(act,send)
   |
   +-(obi,Bob)
   |
   +-(obd,email)
   |   |
   |   +-(adj,an)
   |   |
   |   +-(ptc,asking)
   |       |
   |       +-(obd,him)
   |       |
   |       +-(dlp,if)
   |           |
   |           +-(act,is)
   |               |
   |               +-(obs,he)
   |               |
   |               +-(ptc,going)
   |                   |
   |                   +-(inf,to)
   |                       |
   |                       +-(act,go)
   |                           |
   |                           +-(prp,to)
   |                           |   |
   |                           |   +-(obp,appointment)
   |                           |       |
   |                           |       +-(adj,his)
   |                           |
   |                           +-(prp,by)
   |                               |
   |                               +-(obp,himself)
   |
   +-(.,trm)
```

Figure 6b: Syntactic Tree

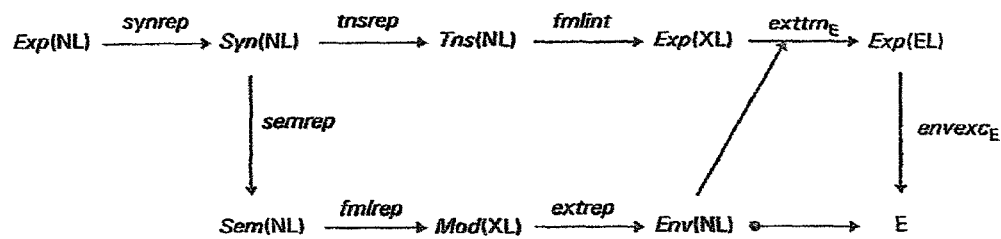
Figure 7a: External Representation / Interpretation Schema
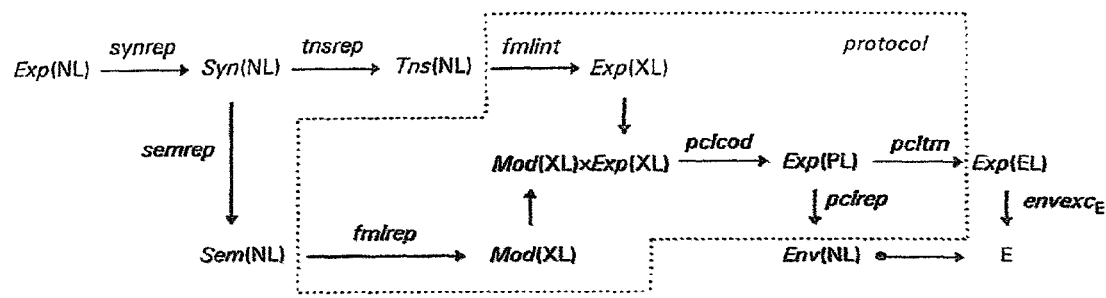
Figure 7b: Protocol Representation / Interpretation Schema

COMPUTER SYSTEM WITH NATURAL LANGUAGE TO MACHINE LANGUAGE TRANSLATOR

This utility application claims the priority date of provisional application Ser. No. 60/235,165 filed on Sep. 23, 2000 with the same title and by the same applicant, Keith Manson.

BACKGROUND OF THE INVENTION

The present invention is directed to a system which translates natural (human) language into an abstract formal language. This formal language is explicitly designed to serve as a universal template for further translations into a comprehensive variety of machine languages which are executable in specific operational environments. Extensive efforts have been made, many articles have been published, and many patents have been issued, all directed toward the goal of providing computers with the capacity to understand natural (human) language sufficiently well to respond reliably and accurately to directives issued from human users. Many companies and research groups, such as AT&T, IBM, and Microsoft, and an assortment of academic institutions, are presently working on natural language processing (NLP).

To date, many different approaches have been tried to provide a system which effectively converts natural language to a formal language for computer applications. One such approach is disclosed in an article published by Microsoft Corporation titled "Microsoft Research: Natural Language Processing Hits High Gear" dated May 3, 2000. The article discloses that Microsoft is heavily focused on a database of logical forms, called MindNet (™), and the creation of a machine translation application. It is stated that MindNet is an initiative in an area of research called "example-based processing", whereby a computer processes input based on something it has encountered before. The MindNet database is created by storing and weighting the semantic graphs produced during the analysis of a document or collection of documents. The system uses this database to find links in meaning between words within a single language or across languages. These stored relationships among words give the system a basis for "understanding", thereby allowing the system to respond to natural language input. MindNet apparently contains the contents of several dictionaries and an encyclopedia to increase its level of understanding. Another approach is disclosed in Microsoft U.S. Pat. No. 5,966,686. This approach provides a rule-based computer system for semantically analyzing natural language sentences. The system first transforms an input sentence into a syntactic parse tree. Semantic analysis then applies three sets of semantic rules to create an initial logical form graph from this tree. Additional rules provide semantically meaningful labels to create additional logical form graph models and to unify redundant elements. The final logical form graph represents the semantic analysis of the input sentence.

Yet another, and apparently more common, approach is provided by U.S. Pat. No. 5,895,466, wherein a database stores a plurality of answers which are indexed to natural language keys. The natural language device receives a natural language question over the network from a remote device and the question is analyzed using a natural language understanding system. Based on this analysis, the database is then queried and an answer is provided to the remote device.

Applicant is aware that various other approaches toward providing a conversion from natural language to some machine language have been tried. However, the prior art has not provided a truly effective conversion system of this sort.

SUMMARY OF THE INVENTION

Presented is a system and method for converting or translating expressions in a natural language such as English into machine executable expressions in a formal language. This translation enables a transformation from the syntactic structures of a natural language into effective algebraic forms for further exact processing. The invention utilizes algorithms employing a reduction of sequences of terms defined over an extensible lexicon into formal syntactic and semantic structures. This term reduction incorporates both syntactic type and semantic context to achieve an effective formal representation and interpretation of the meaning conveyed by any natural language expression.

The foregoing features and advantages of the present invention will be apparent from the following more particular description of the invention. The accompanying drawings, listed herein below, are useful in explaining the invention.

BRIEF DESCRIPTION OF THE DRAWINGS

FIG. 1 shows the hardware architecture of a computer system comprising the natural language converter of the present invention;

FIG. 2 shows the general process and data flow of the inventive system;

FIG. 3 shows a more detailed flow diagram for the inventive system;

FIG. 4*a* shows the results of virtual type assignment applied to a sample text;

FIG. 4*b* shows the results of actual type assignment for the same text;

FIG. 5 shows the term reduction sequence for a sample text;

FIG. 6*a* shows the sequence of dependency chains for a sample text;

FIG. 6*b* shows the associated syntactic tree for the same text; and

FIG. 7*a* shows the schema of structures and maps involved in the external interpretation of a text;

FIG. 7*b* shows this external interpretation schema as controlled by a metasemantic protocol.

BRIEF DESCRIPTION OF THE INVENTION

Refer to FIG. 1 for an overview of the system architecture. As mentioned above, the inventive system, called METASCRIPT (™), provides a method for translating expressions in a natural language such as English into machine executable expressions. In the embodiment of the system and method to be described, the user inputs text in a natural language through some input device to a known computer system which may comprise a standalone computer system, a local network of computing devices, or a global network such as the Internet, using wired land lines, wireless communication, or some combination thereof, etc. This computer system includes memory for storing data, and a data processor. The text may be entered into the client device or local VDM (Video Display Monitor) (1.1) by any suitable means, such as direct input via keyboard (1.1.1), voice input via speech recognition means (an SR system) (1.1.2), or indirect input via optical scanning (an OCR system) (1.1.3). The natural language text input to the system is passed along the network or local bus (1.3) to a server or local CPU (Central Processing Unit) (1.2) where it is processed in accordance with the inventive method and system. This processed output of the system is then provided to the system for distribution to the original input device (1.1), or to other collateral devices (1.4) which may be one or more digital computers, mobile devices, etc. The inventive system thus comprises a natural language interface to any sufficiently capable digital environment.

Refer now to FIG. 2 for an overview of the process and data flow of the inventive system. The invention will be subsequently discussed in more detail herein below. Natural language text input is entered by the user (2.0) into the internal system (2.1) by means of a text processing module (2.1.1) which parses the text. The output of the text processing module comprises a parsed sequence of preexpressions which is entered into the syntactic processing module (2.1.2) which provides syntactic type information, establishes proper syntactic dependencies between terms in expressions, and represents these expressions as complexes in a syntactic algebra. The output of the syntactic processing module, comprising a sequence of these syntactic complexes, is entered into the semantic processing module (2.1.3) in order to achieve a semantic interpretation of the input text. The output of the semantic processing module, comprising a formal interpretation of the input text, is entered into an external system by means of the external processing module (2.2.1), which finally provides a sequence of executable expressions derived from the input text for use in a specific operational environment (2.2.2).

As noted above, the means for providing text input to the system, such as through a keyboard, scanner, or speech recognition system, are well known in the art and are commercially available. Another standard component of the present system is a text parser, construed here in an extremely narrow sense as a limited process restricted to partitioning text strings into syntactic subcomponents such as paragraphs, sentences, and words. As such, the text parser discussed herein does not provide farther linguistic information such as grammatical types, syntactic dependencies, semantic import, etc. Such limited text parsers are standard components of any natural language processing system, and exceedingly well known in the art. Yet another component in the present system which plays a relatively standard role is the lexicon or "electronic dictionary". In general, lexicons are also well known in the art and are discussed in many patents including U.S. Pat. Nos. 5,371,807; 5,724,594; 5,794,050; and 5,966,686. However, the notion and function of "virtual" types, which play a significant syntactic categorization role in the passive specification of lexical terms, and hence strongly contribute to the definition of the particular lexicon used in the inventive system, are not standard, and so require careful description. On the other hand, since text input devices, text parsers, and their operation are so well known, they will not be further described in detail herein.

Refer now to FIG. 3, which shows more details of the inventive system. The components, modules, and submodules of the inventive system are enumerated for convenient reference so that the operation and application of the system and method may be described in detail.

As mentioned above, natural language text is entered by the user (3.0) into the text input submodule (3.1.1) of the text processing module (3.1) via any suitable means including a keyboard or a speech recognition system. For the purposes of this discussion, the user input signal is simply some linguistic data stream which is digitized into a string of ASCII characters. This ASCII string is the input text.

In order to clarify the following discussion, it is helpful to note that any natural language text is typically organized into a sequence of paragraphs, each of which is a sequence of sentences, each of which is a sequence of words, each of which is a sequence of characters (alphanumeric symbols). All of this nested syntactic structure must be taken into account if an effective interpretive analysis is to be achieved. The role of the text parser is to determine and then present these nested sequential structures to the system for further processing. Thus in general, the adequate output of the text parser is a sequence of sequences of sequences of sequences of ASCII characters. This level of generality, however, tends to obscure the basic points of any useful description of the inventive system, so a technical compromise is adopted herein, whereby any text is considered to comprise a sequence of sentences, or more properly, of expressions, each of which comprises a sequence of words. Until recognized by the system as a meaningful unit of linguistic analysis, however, any such word in a text is simply treated as a partitioned substring of the input text string. Thus the proper output of the text parser is considered here to be a sequence of sequences of "pretokens", where a pretoken is a text fragment which is a candidate for a word, i.e. an ASCII (sub)string presented for recognition as a system "token". The system lexicon is a lexicographically ordered list of such tokens (with associated type and reference data), and recognition by the system of a pretoken as an actual token is simply a matter of exact string comparison.

Accordingly, the output of the text parser (3.1.2) is a sequence of sequences of pretokens, or sequence of "preexpressions", which is then passed to the type assignment submodule (3.2.1.1) of the type association submodule (3.2.1), where syntactic processing is initiated. Each pretoken is checked against the system lexicon (3.2.0) for its status as a recognized lexical token. If a pretoken is recognized, i.e. if the string comprising that pretoken is included in the lexicon as an actual token (with associated syntactic and semantic data), then it is assigned a lexically associated syntactic type. The system determines at decision node (3.2.1.2) whether all the pretokens from the entered text have been recognized as system tokens. If the determination is negative, then as indicated by the "no" connection to the lexical insertion submodule (3.2.1.3), the user is given the option to add the unrecognized pretokens to the system as tokens with associated type and reference data, i.e. to insert new terms into the lexicon, for further processing. On the other hand, if the determination is affirmative, then the resulting sequence of sequences of lexically typed tokens, or sequence of "virtual" expressions, is passed along the "yes" connection to the type contextualization submodule (3.2.1.4). This submodule initiates a second order type assignment which uses the initial (or virtual) lexical type assignments as data for a contextual process which may reassign these initial types depending on the relative syntactic roles of the tokens in the virtual expressions being processed. Upon complete (re)assignment of appropriate types to tokens, each virtual expression is promoted to an "actual" expression, and each token/type pair becomes a fully functional lexical term with associated semantic data.

Thus the output of the type association submodule (3.2.1) of the syntactic processing module (3.2) comprises a sequence of (actual) expressions, and is passed to the term correlation submodule (3.2.2.1) of the term resolution module (3.2.2). The output of this submodule is a sequence of sequences of fully correlated lexical terms, which is then entered into the term reduction submodule (3.2.2.2), wherein proper syntactic dependencies between terms in an expression are established by means of a type reduction matrix. The output of this submodule is a sequence of sequences of reduction links, which is entered into the term inversion submodule (3.2.2.3), wherein these reduction links are used to construct syntactic trees, each tree representing a processed expression. The resulting sequence of syntactic trees is passed to the syntactic representation submodule (3.2.3), wherein each expression is then represented as a syntactic complex, i.e. a (usually composite) term in the syntactic algebra.

Semantic processing (3.3) is initiated in the semantic representation submodule (3.3.1), wherein the input sequence of syntactic complexes from the syntactic processing module (3.2) is represented as a full semantic complex, i.e. a structure of internal objects in the semantic algebra. This semantic complex is then passed to the formal representation submodule (3.3.2), wherein the input semantic complex is represented as a formal structure adhering to a fundamental transaction paradigm. This formal semantic model is then combined with the sequence of syntactic complexes output from the syntactic processing module to form the input to the formal interpretation submodule (3.3.3), wherein a sequence of formal expressions is constructed as an interpretation of the presented syntactic and semantic data.

In addition, the output of the formal representation submodule is passed to the external representation submodule (3.4.1) of the external processing module (3.4), wherein a specific external representation appropriate for the formal semantic data presented is identified. This external representation is combined with the sequence of formal expressions output from the formal interpretation submodule to form the input to the external interpretation submodule (3.4.2), wherein a sequence of executable expressions is constructed accordingly for ultimate processing in the appropriate operational environment (3.5).

DETAILED DESCRIPTION OF THE INVENTION

Introduction:

METASCRIPT is a translation from a natural language into an executable formal language. This translation is essentially a transformation from the syntactic structures of natural language into effective algebraic forms suitable for further processing. The formal semantics which finally determines the ensuing interpretations and executions of these formal expressions in external operational environments is object-oriented.

The fundamental algorithm upon which METASCRIPT is based employs a reduction to formal syntactic structures over terms defined in an extensible lexicon. This term reduction incorporates both syntactic type and semantic context to achieve an effective formal representation and interpretation of the meaning conveyed by any natural language expression. Extensibility of the lexicon under specific user direction provides the capacity for the system to expand its knowledge of vocabulary and usage, and consequently, offers an effective mechanism under user control for establishing definite incremental enhancements to the system's linguistic capabilities, hence substantially increasing the system's familiarity with (and competence in) particular operational environments. Put simply, the system learns as it goes. In addition, any desired level of syntactic disambiguation is attainable by increasing the local dimensionality of the underlying reduction matrix, though this feature is part of the underlying algorithm, and therefore independent of user modulation.

It should be noted that METASCRIPT is not a speech recognition system. Instead, it is a fully capable natural language interpreter. Specifically, METASCRIPT translates natural language expressions into expressions in a formal language associated with an abstract network protocol. A more detailed account of this process follows.

Notation:

Standard mathematical notation is used to clarify the presentation of certain technical features of the system. In particular, the following set-theoretical notation appears throughout this discussion:

a) a set is a collection of things, called elements. For example, $N=\{0,1,2,3,\ldots\}$ is the set of natural numbers.

Note: In general, a set A is most conveniently determined by some property P of its elements, indicated by use of so-called "set-builder notation" as $A=\{x|P(x)\}$=the set of things x satisfying property P.

b) the expression '$x \in A$' indicates that the thing x is an element of the set A c) the expression '$A \subseteq B$' indicates that the set A is a subset of the set B, i.e. that every element of A is an element of B as well d) a map (or function) is a relation between two sets A,B such that each element in A is assigned a unique element in B. The expression 'f: $A \to B$' indicates that f is a map from the set A to the set B, i.e. f assigns a unique element $y=f(x) \in B$ to each element $x \in A$. The composition of maps f: $A \to B$ and g: $B \to C$ on sets A,B,C is the map $h=g \circ f$: $A \to C$ defined such that $h(x)=g(f(x)) \in C$ for any $x \in A$.

Note: A program is a function which maps input onto output in an effective manner, i.e. by means of a finite, discrete, deterministic procedure; in fact, any process or procedure is effective precisely to the extent that it is executable as a program of this sort.

e) for any sets A,B, the Cartesian product $A \times B$ consists of all pairs (x,y) such that $x \in A$ and $y \in B$, i.e. $A \times B=\{(x,y)|x \in A, y \in B\}$ f) for any sets A,B the union $A \cup B$ is the set consisting of all elements x such that $x \in A$ or $x \in B$, i.e. $A \cup B=\{x|x \in A$ or $x \in B\}$; for any collection $C=\{A_j|0 \leq j \leq n\}$ of sets $A_j$ for some $n \in N$, the overall union $\cup C$ is the set consisting of unions over all sets $A_j$, i.e. $\cup C=\cup\{A_j|0 \leq j \leq n\}=A_0 \cup \ldots \cup A_n$ g) for any algebras A,B and representation f: $A \to B$, the correlated tensor product $A_f B$ is the distinguished subset of $A \times B$ which consists of all pairs (x,f(x)) for $x \in A$, i.e. $A_f B=\{(x,f(x))|x \in A\}$=the graph of f; for an implicit representation, the map subscript may be omitted, i.e. $AB=A_f B$ for some implicit f: $A \to B$ h) for any set A, Seq(A) is the set of finite sequences from A, i.e. Seq(A)=$\{(a_0, \ldots, a_n)|a_j \in A, n \in N\}$ Definitions:

language: a structure over the following components:

a) alphabet: a set of basic symbols b) punctuation symbols: a set of basic symbols disjoint from the alphabet c) words: admissible sequences of basic symbols d) punctuations: admissible sequences of punctuation symbols e) expressions: admissible sequences of words and/or punctuations
f) sentences: complete expressions
g) syntax: a specification of which
   sequences of basic symbols are admissible as words
   sequences of punctuation symbols are admissible as punctuations
   sequences of words and/or punctuations are admissible as expressions
   expressions are admissible as sentences
g) semantics: a scheme of interpretation over words whereby expressions acquire meaning with respect to certain external structures A number of languages enter into this discussion:
1) natural language: any of the human languages in current use, e.g. English, each characterized by an informal, and hence notoriously ambiguous, syntax and semantics
2) formal language: a highly structured language, usually mathematical in origin and use, characterized by a uniquely readable, recursive syntax and an extensional, usually first-order semantics; in short, a language for which the syntax and semantics is effectively unambiguous
3) object language: a formal language which is interpretable relative to a class of extensional structures, i.e. a formal language with an object-oriented semantics
4) protocol language: a formal language which mediates transactions between addressable nodes on a network
5) executable language: a formal, programmable language which encodes instructions directly implementable by a suitably capable machine such as a computer system: the integrated process which manifests METASCRIPT, and which may be implemented as software running on any programmable device
string: a sequence of ASCII characters
text: a string presented to the system as the fundamental unit of initial input
parser: a process which partitions texts into sequences of sequences of substrings
preexpression: a sequence of substrings of some text, distinguished as a unit of syntactic processing by the text parser
lexicon: a system specific, indexed, lexicographically ordered list of designated strings, called tokens, each of which is associated with certain syntactic and semantic information; in particular, each token is associated with a lexical type, which may be virtual (syntactically ambiguous) or actual syntactically unambiguous); furthermore, each token which is associated with an actual type is also associated with a lexical reference, which provides basic semantic information Note: A single string may serve as a token with multiple entries, associated with a number (including 1) of virtual types and a number of actual types, reflecting that token's multiple syntactic roles, e.g. as a verb and an object, or an object and an adjective, etc. Although there is considerable variability in such syntactic multiplicities among lexical entries, it is still the case that every token is associated with at least one actual type.

token: a string recognized by the system in the sense that it is included in the system lexicon
type: a syntactic category used to organize semantically similar tokens; there are three sorts:
   1) virtual: a lexical type which is ambiguous
   2) actual: a lexical type which is not ambiguous
   3) reduced: a syntactic type which has specific semantic functionality upon term reduction term: there are six sorts:
   1) lexical: a token/type pair in the lexicon with associated reference data
   2) reduced: a token/type pair for which the type is reduced
   3) syntactic: an element of the syntactic algebra associated with a language
   4) semantic: an element of the semantic object algebra associated with a language
   5) tensored: an element of the semantic tensor algebra associated with a language
   6) formal: an interpretable element of a formal language reference: there are two sorts:
   1) internal: an object with which a term is associated, either in the lexicon or in the semantic object algebra
   2) external: an object with which an internal semantic object is associated in some operational environment expression: a sequence of tokens
sentence: a syntactically correct, semantically complete expression
chain: a linearly ordered set of nodes (usually comprising a subset of some tree)
tree: a partially ordered set of nodes
model: a semantic structure M for a formal language FL consisting of
   a) a set Dom(M) of individuals (called the "domain" of M)
   b) a set Rln(M) of relations on Dom(M)
   c) a set Obj(M) of objects (each object containing elements of Dom(M) as elements; also, there is a null object 0∈Obj (M) for technical reasons)
   d) a set Map(M) of functions between objects These individuals, objects, relations, and functions are formal interpretations of corresponding terms in the language FL, and expressions of FL which correctly describe configurations of these various elements which actually obtain in the model are considered to be "true" in the model, or "satisfied" by the model; this satisfaction relation between a model M and an expression $\phi$ of the language FL is denoted as "M⊨$\phi$", meaning that "M is a model of $\phi$", "M satisfies $\phi$", "$\phi$ is satisfied in M", "$\phi$ is true in M", or "$\phi$ holds in M".

operational environment: a dynamic structure E represented as a series of static states $E_k$ (for k∈N), each of which comprises a model for an executable language EL Throughout this discussion, the terms "internal" and "external" are applied relative to the system itself. Thus any component, module, process, or method which is part of the system is considered to be internal, while any user of the system or operational environment for the system is regarded as being external. This distinction is more logical than physical, since an external operational environment for the system may reside on the same computer system or device which hosts the system.

System Sets:
The following sets are defined relative to a language L:
Sym(L): the set of basic symbols for L, usually including an alphabet and various punctuation symbols
Tok(L): the set of lexical tokens for L, i.e. a distinguished subset of Seq(Sym(L))
Ltp(L): the set of lexical types for L
Rtp(L): the set of reduced types for L, including a null type
Trm(L): the set of lexical terms for L, i.e. a distinguished subset of Tok(L)×Ltp(L)

Rdn(L): the set of reduced terms for L, i.e. a distinguished subset of Tok(L)×Rtp(L)

Ref(L): the domain of lexical references for L

Lex(L): the lexicon for L, i.e. a distinguished subset of N×Trm(L)×Ref(L) consisting of a lexicographically ordered list of (index/token/type/reference) entries Txt(L): the set of texts for L, i.e. a subset of Seq(Sym(L)) determined by user input Prx(L): the set of preexpressions for L, i.e. a subset of Seq(Seq(Sym(L))) determined by the parser Exp(L): the set of expressions for L, i.e. a distinguished subset of Seq(Tok(L))

Snt(L): the set of sentences for L, i.e. a distinguished subset of Exp(L)

Tre(L): the set of syntactic trees for L, each having reduced terms from Rdn(L) as nodes Syn(L): the syntactic algebra for L Sem(L): the semantic object algebra for L Tns(L): the semantic tensor algebra for L, viz. Tns(L) =Syn(L)Sem(L) for a canonical map f: Syn(L)→Sem(L)

Mod(L): the set of internal formal models for L

Env(L): the set of external operational environments for L

System Maps:

The following maps are defined relative to a natural language NL, an associated object language XL, a protocol language PL, and an executable language EL associated with an operational environment E:

txtprs: Txt(NL)→Seq(Prx(NL)) is the text parser which maps any text string s∈Txt(NL) onto a sequence txtprs(s) ∈Seq(Prx(NL)) of preexpressions, each of which is a sequence of pretokens, i.e. strings which are candidates for tokens (including punctuations) as determined by inclusion in the lexicon lextyp: N×Tok(NL)→Typ(NL) is the lexical type assignment such that lextyp(n,a)∈Typ(NL) is the lexical type associated in the lexicon with the indexed token (n,a)

lexref: Tok(NL)×Typ(NL)→Ref(NL) is the lexical reference assignment such that lexref(a,e)∈Ref(NL) is the reference associated in the lexicon with the token/type pair (a,e) ∈Tok(NL)×Typ(NL)

Note: If lexref(a,e)=Ø(=null reference) then either (a,e) is not a recognized token/type pair, i.e. there is no entry in the lexicon of the form (n/a/e/r) for any index n, or e is a virtual type; accordingly, the set of lexical terms for NL is defined as Trm(NL)={(a,e)∈Tok(NL)×Typ(NL)| lexref(a,e)≠Ø}. Thus lexical reference properly reduces to an assignment lexref: Trm(NL)→Ref(NL) on actual lexical terms, rather than on random token/type pairs, or even on lexical entries in general.

syntrm: Rdn(NL)→Syn(NL) is the assignment of a basic syntactic term q(d,a)=syntrm(a,d)∈Syn(NL) to each reduced term (a,d)∈Rdn(NL)

·[·]:Syn(NL)×Syn(NL)→Syn(NL) is term application on pairs of complexes q,q'∈Syn(NL) such that q[q']∈Syn(NL) is the composite complex induced by the application of the syntactic term q to the term q'

Note: In fact, Syn(NL) is simply the algebraic closure under the operation of term application over the set of basic complexes associated with the lexical terms of NL by means of the map syntrm on Rdn(NL), i.e. Syn(NL) is defined by induction on term application as follows:
  a) null complex: there is a null term 0∈Syn(NL)
  b) basic complex: q(d,a)=syntrm(a,d)∈Syn(NL) for any reduced term (a,d)∈Rdn(NL)
  c) composite complex: q[q']∈Syn(NL) for any q,q'∈Syn(NL); q[0]=0[q]=q for any q∈Syn(NL)
  d) completeness: q∈Syn(NL) iff q is either the null complex or a basic complex, or a composite complex generated by a finite sequence of term applications over a set of basic complexes syntyp: Syn(L)→Rtp(L) is the syntactic type designator defined by induction on Syn(L) as follows:
  a) null complex: syntyp(0)=nul∈Rtp(NL), where 0∈Syn(NL) is the null term and nul is the null type
  b) basic complex: syntyp(q(d,a))=d∈Rtp(NL) for any reduced term (a,d)∈Rdn(NL)
  c) composite complex: syntyp(q[q'])=syntyp(q)∈Rtp(NL) for any q,q'∈Syn(NL);

subtrm: Syn(NL)×Rtp(NL)→Syn(NL) is the subterm designator such that subtrm(q,d)∈Syn(NL) is the leading subcomplex of syntactic type d∈Rtp(NL) in the syntactic complex q∈Syn(NL). The precise definition of subtrm proceeds by induction on Syn(NL) as follows:
  a) null complex: subtrm(0,d)=0 for any type d∈Rtp(NL), where 0∈Syn(NL) is the null term
  b) basic complex: subtrm(q(d',a),d)=q(d',a) if d'=d, and subtrm(q(d',a),d)=0 if d'≠d, for any type d∈Rtp(NL) and reduced term (a,d')∈Rdn(NL)
  c) composite complex: subtrm(q[q'],d)=subtrm(q'',d)∈Syn(NL) for any q,q'∈Syn(NL) and type d∈Rtp(NL), where q''=q if subtrm(q,d)≠0, and q''=q' otherwise Note: subtrm(q,d)=0 if there is no subcomplex of type d∈Rtp(NL) in the syntactic complex q∈Syn(NL); otherwise, syntyp(subtrm(q,d))=d∈Rtp(NL). Also, by default, subtrm(q, nul)=0 for all q∈Syn(NL), i.e. the null term is a subterm of every syntactic complex.

synrep: Exp(NL)→Syn(NL) is the syntactic representation such that synrep(p)∈Syn(NL) is the syntactic complex associated with the expression p∈Exp(NL)

Note: The system currently constructs synrep as a composition of the maps syntre: Exp(NL)→Tre(NL) and trerep: Tre(NL)→Syn(NL), where syntre associates a syntactic tree syntre(p)∈Tre(NL) with each expression p∈Exp(NL), and trerep associates a syntactic complex trerep(t)∈Syn(NL) with each syntactic tree t∈Tre(NL) over the assignment of basic syntactic terms q(d,a)=syntrm(a,d) to nodes (a,d)∈t, i.e. the representation synrep trerep∘syntre: Exp(NL)→Syn(NL)

*: Sem(NL)×Sem(NL)→Sem(NL) is the semantic product on semantic objects in the semantic object algebra Sem(NL) such that *(x,y)=x*y∈Sem(NL) is the minimal common upper bound of any pair of objects x,y in the induced class inheritance lattice on Sem(NL), with the second term of the product dominant over the first relative to consistency issues, i.e. y dominant over x in x*y Note: In fact, Sem(NL) is simply the algebraic closure under the semantic product over the kernel Ref(NL) of lexical references associated with the lexical terms of NL by means of the map lexref: Trm(NL)→Ref(NL), i.e. Sem(NL) is defined by induction on the semantic product as follows:
  a) identity object: there is an identity element 1∈Sem(NL)
  b) lexical object: lexref(a,e)∈Sem(NL) for any lexical term (a,e)∈Trm(NL), i.e. Ref(NL)⊆Sem(NL)
  c) composite object: x*y∈Sem(NL) for any objects x,y∈Sem(NL); x*1=1*x=x for each x∈Sem(NL)
  d) completeness: x∈Sem(NL) iff x is either the identity object or a lexical object, or a composite object generated by a finite sequence of semantic products over a set of lexical objects semrep: Syn(NL)→Sem(NL) is the semantic representation such that semrep(q)∈Sem(NL) is the semantic reference associated with the syntactic term $q \in Syn(NL)$; moreover semrep is the implicit representation in the definition of the semantic tensor algebra $Tns(NL)=Syn(NL)$ $Sem(NL)=Syn(NL)_{semrep}Sem(NL)$ Note: Semantic reference makes contact with lexical reference in that $semrep(q(d(e),a))=lexref(a,e) \in Ref(NL)$ for every basic complex $q(d(e),a) \in Syn(NL)$ naturally associated (after term reduction: $(a,e) \to (a,d(e))$) with a reduced term $(a,d(e)) \in Rdn(NL)$; moreover, semrep: $Syn(NL) \to Sem(NL)$ is a homomorphism from the syntactic algebra to the semantic object algebra in that a) null→identity: $semrep(0)=1$ where $0 \in Syn(NL)$ is the null complex and $1 \in Sem(NL)$ is the identity object b) basic→lexical: $semref(q(d(e),a))=lexref(a,e) \in Sem(NL)$ for any lexical term $(a,e) \in Trm(NL)$ and associated reduced term $(a,d(e)) \in Rdn(NL)$, where $q(d(e),a)=syntrm(a,d(e)) \in Syn(NL)$ is a basic complex c) composite→composite: $semref(q[q'])$ $semref(q)*semref(q') \in Sem(NL)$ for any complexes $q,q' \in Syn(NL)$ tnsrep: $Syn(NL) \to Tns(NL)$ is the tensor representation such that $tnsrep(q)=qsemrep(q) \in Tns(NL)$ is the tensored complex associated with the syntactic term $q \in Syn(NL)$, and implicitly, with the semantic reference $semrep(q) \in Sem(NL)$ fmlrep: $Sem(NL) \to Mod(XL)$ is the formal representation such that $fmlrep(x) \in Mod(XL)$ is the formal model associated with the semantic context $x \in Sem(NL)$ fmlint: $Tns(NL) \to Exp(XL)$ is the formal interpretation such that $fmlint(u) \in Exp(XL)$ is the formal expression associated with the tensored complex $u \in Tns(NL)$ modref$_M$: $Trm(XL) \to M$ for each $M \in Mod(XL)$ is the model reference such that $modref_M(v) \in M$ is the model element referenced by the term $v \in Trm(XL)$; if there is no actual reference for v in M then $modref_M(v)=0$ M is the null object by default extrep: $Mod(XL) \to Env(NL)$ is the external representation such that $extrep(M) \in Env(NL)$ is the external operational environment associated with the internal formal model $M \in Mod(XL)$ extint$_E$: $Trm(PL) \to Trm(EL)$ is the external term interpretation relative to an operational environment $E \in Env(NL)$ with an associated executable language EL such that $extint_E(v) \in Trm(EL)$ is the external term corresponding to the protocol term $v \in Trm(PL)$ exttrn$_E$: $Exp(XL) \to Exp(EL)$ is the external translation relative to an operational environment $E \in Env(NL)$ with an associated executable language EL such that $exttrn_E(\phi) \in Exp(EL)$ is the executable translate of the formal expression $\phi \in Exp(XL)$ envexc$_E$: $Exp(EL) \to E$ is the execution process for an operational environment $E \in Env(NL)$ with an associated executable language EL such that $envexc_E(\xi) \in E$ is the result of executing the formal expression $\xi \in Exp(EL)$ in E Note: An execution process for an operational environment $E=\{E_k | k \in N\}$ and executable language EL is defined with respect to an execution procedure $envprc_E$: $Exp(EL) \times N \to N$ such that for any executable expression $\xi \in Exp(EL)$ and operational state index $k \in N$, the image state $E_{j(k)}|=\xi$ (i.e. the model $E_{s(k)}$ satisfies the expression $\xi$), where the image index $J(k)=envprc_E(\xi,k)>k$. In terms of a sequence of operations in E, any specific execution of an expression $\xi \in Exp(EL)$ is then simply the operational state $envexc_E(\xi)=envprc_E(\xi,n) \in E$ for some index $n \in N$.

pclint: $Sem(NL) \to Trm(PL)$ is the protocol interpretation such that $pclint(x) \in Trm(PL)$ is the protocol term corresponding to the semantic object $x \in Sem(NL)$ pclcod: $Mod(XL) \times Exp(XL) \to Exp(PL)$ is the protocol encoding such that $pclcod(M,\phi) \in Exp(PL)$ is the protocol expression associated with the formal expression $\phi \in Exp(XL)$ as interpreted with respect to the formal model $M \in Mod(XL)$ pclrep: $Exp(PL) \to Env(NL)$ is the external protocol representation such that $pclrep(X) \in Env(NL)$ is the external operational environment encoded into the protocol expression $X \in Exp(PL)$ pcltrn: $Exp(PL) \to Exp(EL)$ is the external protocol translation such that $pcltrn(X) \in Exp(EL)$ is the formal expression encoded into the protocol expression $X \in Exp(PL)$ for execution in the external operational environment $E=pclrep(X) \in Env(NL)$.

extref: $Exp(PL) \times Trm(PL) \to Env^*(NL) = Env(NL) \cup (\cup Env(NL))$ is the uniform external reference such that $extref(X,T)$ is the external element referenced by the term of metatype $T \in Typ(PL)$ in the protocol expression $X \in Exp(PL)$; if there is no actual reference of this type then $extref(X,T)=0$ is the null object by default Note: The uniform range $Env^*(NL)=Env(NL) \cup (Env(NL))$ of extref, where $\cup Env(NL)$=the combined set of elements from all environments $E \in Env(NL)$), accommodates reference with respect to terms of metatype $ENV \in Typ(PL)$ as well as all other terms, since the reference extref $(X,\text{ENV})$ is an operational environment for any protocol expression $X \in Exp(PL)$, i.e. $extref(X,\text{ENV}) \in Env(NL)$, whereas the referenced external element $extref(X,\text{ABC})$ for any other metatype $\text{ABC} \in Typ(PL)$ is an element of the operational environment $extref(X,\text{ENV})$, i.e. $\text{ABC} \neq \text{ENV} extref(X,\text{ABC}) \in extref(X,\text{ENV})$; therefore, the range of extref must be mixed between operational environments and elements of these environments.

envref$_E$: $Trm(PL) \to E$ for each $E \in Env(NL)$ is the operational environment reference such that $envref_E(v) \in M$ is the environment element referenced by the term $v \in Trm(PL)$; if there is no actual reference for v in E then $envref_E(v)=0 \in E$ is the null object by default Put succinctly, METASCRIPT is an effective transformation mscript: $Exp(NL) \to Exp(PL)$ of natural language expressions into formal expressions in the abstract language PL associated with a universal protocol. Using a formal metasemantics over the object language XL associated with NL, this protocol is explicitly designed to accommodate further effective translations $exttrn_E$: $Exp(XL) \to Exp(EL)$ for specific operational environments $E \in Env(NL)$ with associated executable languages EL.

It should be noted that a particular protocol is utilized in certain sections of this description for the purposes of specificity and clarity. In this exemplary embodiment, the protocol is XMP (for eXternal Media Protocol), which is designed and used as a universal transaction medium for diverse digital components in a networked environment. However, the invention and functionality of this system is not limited to any specific protocol.

System Processes:

Text Processing: Refer to Module 3.1 of FIG. 3.

Text Input: Refer to Submodule 3.1.1 of FIG. 3.

Any text is presented to the system as a string of ASCII characters. The specific method of text presentation is irrelevant. It may be voice-generated, entered via keyboard, optically scanned, etc. The system itself does not explicitly include a module for speech recognition, optical character recognition, etc., but any effective mechanism for presenting ASCII text to the system is sufficient for its successful operation.

The following text string represents a typical input:

Send Bob an email asking him if he is going to go to his appointment by himself.

This example will be carried throughout the following discussion in order to illustrate the METASCRIPT process in some detail.

Text Parser: Refer to Submodule 3.1.2 of FIG. 3.

The text parser partitions any string of ASCII characters into sequences of sequences of ASCII substrings, using embedded blank spaces as delimiters. These inner sequences of substrings represent potential expressions, and the substrings themselves represent potential words or punctuation marks. For terminological convenience, any such parsed substring is called a pretoken, and the partitioned sequence in which it occurs is called a preexpression.

Applied to the sample text string introduced above, the parser produces the following sequence of pretokens:

(send,Bob,an,email,asking,him,if,he,is,going,to,go,to,his, appointment,by,himself,.)

Syntactic Processing: Refer to Module 3.2 of FIG. 3.

Type Association: Refer to Submodule 3.2.1 of FIG. 3.

Type Assignment: Refer to Submodule 3.2.1.1 of FIG. 3.

Each parsed pretoken is checked against the lexicon for recognition by the system. If a pretoken is recognized, i.e. if that string is included in the lexicon as an actual token, then it is immediately associated with some type. This first order assignment of type to token is only tentative at this point in the process, since correct type association requires more than mere lexical recognition of text strings as legitimate tokens. Accordingly, these initially assigned types are considered to be "virtual" types.

Virtual type assignment on the sample preexpression parsed above yields the following list of token/type pairs (lexical terms) in the form (a,lextyp(0,a)) for each indicated token a∈Tok(NL) as shown in FIG. 4a. Since all pretokens listed there are recognized by the system as actual tokens, the parsed preexpression becomes an expression for further processing. However, the presence of ambiguous (virtual) types classifies this expression as "virtual". Promotion to an "actual" expression is deferred to the type contextualization process.

Lexical Insertion: Refer to Submodule 3.2.1.3 of FIG. 3.

If a pretoken is not recognized by the system, then the user is prompted for information concerning lexical type and reference which may be properly associated with that pretoken in order to form a lexical term appropriate for inclusion in the lexicon. Upon such inclusion, the pretoken becomes a system token. This is the primary mechanism, and the only one under direct user control, by which the system learns new vocabulary.

Type Contextualization: Refer to Submodule 3.2.1.4 of FIG. 3.

Second order type assignment uses the initial lexical type assignments to tokens in an expression as data for a contextual process by which actual types may be assigned to tokens depending on their syntactic roles relative to other tokens in that expression. For example, in the sentence I want to go to the store.

the word "to" is of ambiguous type because it appears in two different guises, once as the prefix of the infinitive "to go" and later as the preposition in the phrase "to the store". The system is able to discern such grammatical differences and assign correct types based on syntactic context.

This method of type reassignment through syntactic context alone represents the simplest, most direct form of disambiguation employed by the system. More subtle mechanisms for further disambiguation, such as local type reduction and semantic contextualization, are deployed later in the process.

In any case, final type association on the sample expression being processed yields the list shown in FIG. 4b of refined lexical terms in the form (a,lextyp(j,a)) for each indicated token a∈Tok(NL), where $j \geq 0$ is the (perhaps alternative) index corresponding to the appropriate refined type. Note that all the ambiguous (virtual) lexical types have been replaced by unambiguous (actual) types. This type reassignment promotes a virtual expression to an actual expression suitable for further syntactic processing.

Term Resolution: Refer to Submodule 3.2.2 of FIG. 3.

Term Correlation: Refer to Submodule 3.2.2.1 of FIG. 3.

Indirect references by various syntactic elements such as pronouns must be correlated to direct references elsewhere in the text. This task is achieved through type matching in the context of appropriate syntactic configurations. For example, in the sentence Inform Bob about the next meeting, and tell him that it will happen later than usual.

the pronoun "him" naturally correlates with "Bob", and "it" with "meeting". The system establishes such correlations first by executing a simple type/reference matching such as (him→male person→Bob) on antecedents, and then by evaluating such matches for probable fit according to context. For example, in the extended sentence Inform Bob about the next meeting at the factory, and tell him that it will happen later than usual.

there are two possible type/reference matches for "it", viz. (it→some object→{meeting, factory}), but clearly, on the basis of object characteristics, the match (it→some object→meeting) is a better fit than (it→some object→factory) in the context of the phrase " . . . it will happen later than usual" since meetings happen more readily than factories do, as any capable scheme of lexical reference will indicate. It should be noted, of course, that this process must be applied to a text as a whole, not just to individual expressions, so that indirect references across multiple expressions may be correlated properly.

Accordingly, the following simple term correlations are made within the sample expression being processed:

5) (him,ppm)→(Bob,pnm)
7) (he,ppm)→(Bob,pnm)
13) (his,psm)→(Bob's,psm)
16) (himself, prm)→(Bob, pnm)

Term Reduction: Refer to Submodule 3.2.2.2 of FIG. 3.

Proper syntactic dependencies between terms in an expression are established by means of a type reduction matrix. The dimensions of this matrix help to determine the level of syntactic disambiguation quickly achievable by the system. A 2-dimensional matrix, which maps pairs of tokens into their relative reduction ordering, is minimal. Higher dimensional reduction matrices, which map longer sequences of tokens into their relative reduction orderings, are increasingly effective, but more costly to implement in terms of memory requirements and processing speed. An optimal number of reduction dimensions, of course, depends critically on a complex combination of implementation constraints and performance criteria. Whatever the number of dimensions used, however, the system is designed to establish correct syntactic relationships on a relatively global scale (at least over an entire expression) simply by executing local term reductions in the proper order.

For example, using a minimal matrix on the sample expression being processed, the local term reduction sequence is constructed as shown in FIG. 5.

Term Inversion: Refer to Submodule 3.2.2.3 of FIG. 3.

Proper chains of syntactic dependencies among tokens in a sentence, and the resultant dependencies between those chains, are constructed by means of an effective inversion of the term reduction process. These chains are then used to generate branches of the syntactic tree which represents the underlying syntactic structure of the expression being processed.

On the sample reduction sequence just constructed, term inversion produces the maximal chains shown in FIG. 6a. Note that term reduction has effected critical type modulations in some of the subordinate terms, viz. obj→obd (general object→direct object), obj→obi (general object→indirect object), obj→obs (general object→verb subject), and obj→obp (general object→preposition object). These reduced types are critical data for accurate semantic processing.

Syntactic Representation: Refer to Submodule 3.2.3 of FIG. 3.

Each expression for a language is represented at the fundamental syntactic structural level by a tree, i.e. by a finitely branching partial order of finite length having elements corresponding to lexical terms ordered by their associated type reductions. This tree has a canonical representation as a natural branching diagram, which in turn becomes represented as a (usually composite) term (syntactic complex) in an associated syntactic algebra. The branches of this tree correspond directly to the chains of syntactic dependencies established in the term resolution process.

For example, the syntactic tree representing the sample text being processed becomes structured as shown in FIG. 6b. Nodes of a syntactic tree and the syntactic order relations which hold between them are interpreted in terms of a many-sorted syntactic structure. The canonical language for this class of structures is based on the notion of a type/token complex to form basic terms, and the operation of term application on pairs of these complexes to form more complicated or composite terms. Each term, whether basic or composite, ultimately corresponds to a semantic object with certain characteristics, and these objects in their various configurations comprise the domains and internal relations of the syntactic structures considered.

More specifically, under METASCRIPT the formal correlate of an expression in a natural language is a term in the associated syntactic algebra which represents the effective translation of the expression into a form suitable for direct system interpretation. This algebra is based on an operation of term application which, given a translation of natural language expressions into algebraic terms, transforms syntactic dependencies at the level of natural language into specific formal relations at an algebraic level. Thus the syntactics for natural language becomes a matter of effective computation.

Each node (type/token pair) $(d,a)$ in a syntactic tree $t(p)=\text{syntre}(p)\epsilon\text{Tre}(NL)$ representing an expression $p\epsilon\text{Exp}(NL)$ corresponds to a reduced term (token/type pair) $(a,d)\epsilon\text{Rdn}(NL)$, and is associated with a basic complex $q(d,a)\epsilon\text{Syn}(NL)$ by means of the syntactic assignment syntrm: $\text{Rdn}(NL)\to\text{Syn}(NL)$, i.e. $q(d,a)=\text{syntrm}(a,d)$. The immediate syntactic dependence of another term $(d',a')$ on $(d,a)$ determined by term reduction is signified at the tree level as the order relation $(d,a) \text{ L } (d',a')$. The algebraic operation of term application $\cdot[\cdot]$: $\text{Syn}(NL)\times\text{Syn}(NL)\to\text{Syn}(NL)$ on pairs of syntactic complexes then yields composite complexes of the form $q''=q[q'']$ induced by these syntactic dependency relations; for example, in the particular case considered here involving the terms $(d,a)$ and $(d',a')$, term application results in the composite complex $q''(d,a),(d',a'))=q(d,a)[q'(d',a')]=\text{syntrm}(a,d)[\text{syntrm}(a',d')]$.

Similarly, a chain of syntactic dependencies yields iterated applications on increasingly composite complexes and the basic complex which represents the next link in the dependency chain, i.e. the relation $z_0 \text{ L } z_1 \text{ L } z_2$ between syntactic terms $z_0,z_1,z_2\epsilon\text{Trm}(NL)$ yields the algebraic term $q_0[q_1[q_2]]\epsilon\text{Syn}(NL)$ where $q_j=\text{semtrm}(z_j)$, etc. On the other hand, branching in a syntactic tree yields a slightly different form for the associated algebraic term, in that a dependency relation of the form $z_0 \text{ L } (z_1,z_2)$, whereby syntactic terms $z_1$ and $z_2$ are both directly dependent on $z_0$ (i.e. $z_0 \text{ L } z_1$ and $z_0 \text{ L } z_2$), yields the algebraic term $q_0[q_1][q_2]=(q_0[q_1])[q_2]\neq q_0[q_1[q_2]]$, i.e term application is not an associative algebraic operation.

In any case, continued term applications of this sort, as explicitly induced by the dependency structure of the syntactic tree, thus yield an effective representation of any expression in a language NL as a (usually composite) term in the associated syntactic algebra Syn(NL). For example, the syntactic complex corresponding to the sample expression being processed is

---

(act,send)[(obi,Bob)][(obd,email)][(adj,an)][(ptc,asking)
 [(ltm, if)[(act,is)[(ptc,going)[(inf,to)[(act,go)
  [(prp,to)[(obp,appointment)[(adj,his)]]]
   [(prp,by)[(obp,himself)]]]]]]]]]

---

This algebraic form of the expression is critical for the language processing which follows; in particular, the syntactic representation of expressions afforded by algebraic term reduction provides an effective recursion structure for accurate semantic processing.

In summary, each expression $p\epsilon\text{Exp}(NL)$ is represented as a syntactic tree $t(p)=\text{syntre}(p)\epsilon\text{Tre}(NL)$ which induces an associated syntactic complex $q(t(p))=\text{trerep}(t(p))\epsilon\text{Syn}(NL)$. A detailed definition of the intermediate syntactic algebraic representation trerep: $\text{Tre}(NL)\to\text{Syn}(NL)$ is given by induction on syntactic dependence:

a) null dependence: $\text{trerep}(d,a)=\text{syntrm}(a,d)$ for any trivial (single node) tree $(d,a)\epsilon\text{Tre}(NL)$
b) direct dependence: $\text{trerep}(t \text{ L } t')=\text{trerep}(t)[\text{trerep}(t')]$ for any trees $t,t'\epsilon\text{Tre}(NL)$
c) multiple dependence: $\text{trerep}(t \text{ L } (t',t''))=(\text{trerep}(t)[\text{trerep}(t')])[\text{trerep}(t'')]$ for any trees $t,t',t''\epsilon\text{Tre}(NL)$ Full syntactic representation is then simply the composition synrep=trerep∘syntre: $\text{Exp}(NL)\to\text{Syn}(NL)$.

Semantic Processing: Refer to Module 3.3 of FIG. 3.

Semantic Representation: Refer to Submodule 3.3.1 of FIG. 3.

The lexical reference map lexref: $\text{Trm}(NL)\to\text{Ref}(NL)$ forms the basis for the interpretation of terms in the semantic algebra Sem(NL) as objects constructed over the reference domain Ref(NL). Specifically, each lexical term (token/type pair) $(a,e)\epsilon\text{Trm}(NL)$ is explicitly associated in the lexicon with a reference $\text{lexref}(a,e)\epsilon\text{Ref}(NL)$ which instantiates the term in a given environment; in fact, no lexical term is properly defined until such a reference for it is specified, since this definition forms the principal link between a natural language term and its intended meanings. The basic objects of the semantic algebra are simply these lexical references, i.e. Ref(NL)⊆Sem(NL).

This first order notion of reference for lexical terms is then extended to more complex semantic terms by means of a semantic product *: Sem(NL)×Sem(NL)→Sem(NL) on objects which allows a proper definition of a semantic representation semrep: Syn(NL)→Sem(NL) on the entire algebra Syn(NL). By induction on the composition of syntactic complexes, the full definition becomes:

a) null: semrep(0)=1 where 0∈Syn(NL) is the null complex and 1∈Sem(NL) is the identity object
b) basic: semref(q(d(e),a))=lexref(a,e)∈Sem(NL) for any lexical term (a,e)∈Trm(NL) and associated reduced term (a,d(e))∈Rdn(NL), where q(d(e),a)=syntrm(a,d(e))∈Syn(NL) is a basic complex
c) composite: semref(q[q'])=semref(q)*semref(q')∈Sem(NL) for any complexes q,q'Syn(NL)

By this definition, semrep is clearly a homomorphism from the syntactic algebra into the semantic object algebra.

For example, given the dependency structure $z_0$ L $z_1$ L $z_0$ on certain lexical terms $z_j$ $(a_j,e_j)$∈Trm(NL) with associated syntactic complexes $q_{j=q(zj)}$∈Syn(NL) for j=0,1,2, there is a composite complex $q_3=q_0[q_1[q_2]]$∈Syn(NL) constructed by iterated syntactic term application with semantic reference $$semrep(q_3) = semrep(q_0[q_1[q_2]])$$
$$= semrep(q_0) * semrep([q_1[q_2]])$$
$$= semrep(q_0) * (semrep(q_1) * semrep(q_2))$$
$$= lexref(a_0, e_0) * (lexref(a_1, e_1) * lexref(a_2, e_2))$$

in Sem(NL) derived from the individual lexical references lexref$(a_j,e_j)$∈Ref(NL)⊆Sem(NL).

The definition of the semantic product *: Sem(NL)×Sem(NL)→Sem(NL) is based on a notion similar to class inheritance from the formal practice of object-oriented design (OOD). Specifically, each reference in Sem(NL) is instantiated as an object with certain characteristics, and the product x*y of two objects x,y∈Sem(NL) is simply the object z∈Sem(NL) generated in the inheritance lattice as the minimal common upper bound of x and y, with y dominant over x on issues of conjunctive consistency. Note that by virtue of consistency dominance this product need not be commutative, i.e. it is not necessarily the case that x*y=y*x for all x,y∈Sem(NL); similarly, this product need not be associative, i.e. it is not necessarily the case that x*(y*z)=(x*y)*z for all x,y,z∈Sem(NL). However, it is idempotent, i.e. x*x=x for all x∈Sem(NL).

It is primarily through this algebraic generation of composite objects that the system gains its complexity; moreover, the addition of terms to the lexicon which have these composite objects as their direct lexical references permits unlimited efficiency and sophistication of machine comprehensible natural language usage.

The semantic tensor algebra Tns(NL)=Syn(NL)Sem(NL) defined over the representation semrep: Syn(NL)→Sem(NL) is composed of tensored correlations qsemrep(q) of syntactic terms q∈Syn(NL) and associated semantic representations semrep(q)∈Sem(NL), which form the direct computational basis for formal interpretations of natural language expressions in terms of a fundamental transaction paradigm. Specifically, the syntactic relationships encoded in a syntactic complex q(p)∈Syn(NL) derived from an expression p∈Exp(NL) permit an exact internal structuring of the associated semantic complex semrep(q(p))∈Sem(NL).

Formal Representation: Refer to Submodule 3.3.2 of FIG. 3.

Associated with any expression p∈Exp(NL) is the semantic context c(p)=contxt(q(p),s(p))∈Sem(NL) where q(p)=synrep(p)∈Syn(NL) is the syntactic complex representing p and s(p)∈Txt(NL) is the original input text from which p is derived through text parsing and type association. This semantic context c(p) is formally represented as an internal structure M(p)=fmlrep(c(p))∈Mod(XL), which serves as an abstract model of the operational environment in which p is to be executed after translation into a suitably effective form. As formal representatives in this modeling capacity, these internal structures for XL form the critical link between NL and any executable language EL for an external environment E.

The semantic context c(p) is constructed as an object in the algebra Sem(NL) as follows: After text parsing and type association, the text s(p) is represented as a sequence $(p_0, \ldots, p_n)$∈Seq(xp(NL)) of expressions $p_j$∈Exp(NL) for some n≥0, where $p=p_{j(p)}$ for some index $j(p)$∈{0, ..., n}. Note that $s(p_j)=s(p)$ for 0≤j≤n. The definition of the representation contxt(q($p_j$),s(p))∈Sem(NL) proceeds by induction on the indices j∈{0, ..., n} where q($p_j$)∈Syn(NL) is the syntactic complex representing $p_j$. Entering into this definition is the metaterm operator pcltrm: Syn(NL)×Typ(PL)→Syn(NL) associated with the protocol language PL as described in the following section. Briefly, for any syntactic complex q∈Syn(NL) and metatype ABC∈Typ(PL), the syntactic term pcltrm(q,ABC)∈Syn(NL) is the leading subterm of q of type ABC; in particular, subterms pcltrm(q, ENV)∈Syn(NL) of metatype ENV∈Typ(PL) (indicating "environment") play a significant role.

Specifically, the inductive definition of contxt: Syn(NL)×Txt(NL)→Sem(NL) is as follows:

a) j=0: contxt(q($p_0$),s(p))=semrep(pcltrm(q($p_0$),ENV))∈Sem(NL)
b) j=k+1 for k<n: contxt(q($p_{k+1}$),s(p))=contxt(q($p_k$), s(p))*semrep(pcltrm(q($p_{k+1}$),ENV))∈Sem(NL)

Then c(p)=contxt(q(p),s(p))=contxt(q($p_{j(p)}$),s(p))∈Sem(NL), and M(p)=fmlrep(c(p))∈Mod(XL) by means of the formal representation fmlrep: Sem(NL)→Mod(XL). The noncommutativity of the semantic product is critical in this definition.

Formal Interpretation: Refer to Submodule 3.3.3 of FIG. 3.

The formal term interpretation trmint: Sem(NL)×Mod(XL)→Trm(XL) establishes the syntactic basis for the formalization of NL, since expressions φ(p)∈Exp(XL) constructed as formal interpretations of natural expressions p∈Exp(NL) are built from terms in Trm(XL) associated through trmint with appropriate objects in Sem(NL). In some extremely approximate sense, φ(p)=q(p)×trmint(x(p)) where q(p)=synrep(p)∈Syn(NL) is the syntactic complex representing p and x(p)=semrep(q(p))∈Sem(NL) is the semantic complex representing q(p).

The formal semantics, or metasemantics, by which these formal interpretations are constructed is called MEAO (for Modified Environment Action Object). It is based on a fundamental transaction paradigm for which the elementary operation is a mapping f: A→B on structures A,B∈Obj(M) in an environment M. Terms of an object language for this semantics reflect this fundamental orientation, and a basic statement in any such language is simply an assignment of the form "$x_B=f_B^A(x_A)$" where $x_A$∈A, $x_B$∈B, and $f_B^A$: A→B. More complicated expressions are constructed from these basic (or atomic) statements by means of the usual formal propositional connectives (negation, conjunction, disjunction, and implication) and quantification (existential and universal). Of course, any of the individuals, objects, functions, and environments which serve as interpreted elements for such a language may be arbitrarily articulated, thus extremely complex despite the apparent simplicity of this formal syntax; hence the notion of "modification" (the M in MEAO) plays a significant role.

As previously indicated, the proper formal interpretation of an expression p∈Exp(NL) relative to a semantics for the object language XL is induced by a map trmint: Sem(NL)→Trm(XL). However, the actual computation of MEAO elements from the syntactic and semantic apparatus of NL is performed in terms of a formal protocol which implements this metasemantics in an effective manner.

Specifically, there is a metaterm operator pcltrm: Syn(NL)×Typ(PL)→Syn(NL) for the protocol language PL associated with XL, which is built from conditional sequences (in essence, executable routines) of syntactic subterm assignments yielded by the standard subterm designator subtrm: Syn(NL)×Rtp(NL)→Syn(NL). Distinguished semantic types T∈Typ(PL) determine certain syntactic subterms q(p)T=pcltrm(q(p),T) ∈Syn(NL) of the syntactic complex q(p)∈Syn(NL), and these syntactic subterms yield semantic representations x(p)r=semrep(q(p)T)∈Sem(NL).

It is at this point that the formal term interpretation trmint: Sem(NL)→Trm(XL) comes into play as the basis of the formal semantics for XL. From the perspective of an effective metasemantics for XL, however, this term interpretation is derived from a higher level protocol interpretation pclint: Sem(NL)→Trm(PL) by composition with an intermediate formal interpretation fmltrm: Trm(PL)→Trm(XL) as trmint=fmltrm∘pclint: Sem(NL)→Trm(PL)→Trm(XL)

It is in this precise sense, coupled with the fact that the internal model M(p)=fmlrep(c(p))∈Mod(XL) is also interpreted as an element for PL corresponding to a term V(p)$_{ENV}$=pclint(c(p),ENV)∈Trm(PL) relative to the metatype ENV∈Typ(PL) (indicating "environment"), that PL constitutes an effective formal metalanguage for XL, whereas NL is an informal metalanguage for XL.

In any case, the semantic representations xp)$_T$∈Sem(NL) are interpreted as formal terms v(p)$_T$=trmint(x(P)$_T$)=fmltrm∘pclint(x(P)$_T$)∈Trm(XL). These terms then designate formal elements h(p)$_T$=modref$_{M(p)}$(v(p)$_T$)∈M(p) by means of the model reference map modref$_{M(p)}$: Trm(XL)→M(p). Finally, these elements are structured by the syntactic complex q(p) into the formal configuration K(p)⊆M(p), which is exactly described by the formal expression φ(p)=fmlint(u(p))∈Exp(XL), where u(p)=q(p)×semrep(q(p))∈Tns(NL) is the semantic tensor complex representing p. More precisely, K(p) is the minimal substructure of M(p) satisfying φ(p), i.e. M(p)⊇K(p)⊨φ(p).

Again, in the simplest case conforming to MEAO semantics, the structure K(p) consists of a) an object A=modref$_{M(p)}$(v(p)$_{DMN}$)∈Obj(M(p)) for a term v(p)$_{DMN}$∈Trm(XL) of metatype DMN∈Typ(PL)

b) an object B=modref$_{M(p)}$v(p)$_{RNG}$)∈Obj(M(p)) for a term v(p)$_{RNG}$∈Trm(XL) of metatype RNG∈Typ(PL)

c) a map $f_B^A = modref_{M(p)}(v(p)_{MAP}) \in Map(M(p))$ for a term $v(p)_{MAP} \in Trm(XL)$ of metatype $MAP \in Typ(PL)$ d) an element $x_A$ modref$_{M(p)}$(v(p)$_{OBJ}$)∈A for a term v(p)$_{ARG}$∈Trm(XL) of metatype ARG∈Typ(PL)

e) an element $x_B = f_B^A(x_A) \in B$ while the formal description φ(p) is simply the statement $$`x_B = f_B^A(x_A)`.$$

As the formal description of an abstract configuration K(p) in the internal model M(p), the expression φ(p) is not an executable translate of the natural expression p; instead, it is a formal interpretation of the precise conditions, relative to an abstract model of an operational environment, upon which an effective executable form of p may be constructed. The ultimate transition to an appropriate external operational environment is properly accomplished by means of the metasemantic protocol. In essence, the construction of a metaformal expression X(p)∈Exp(PL) as a fully effective translation of an expression p∈Exp(NL) is simply a machine interpretable codification of the satisfaction relation M(p)⊨φ(p).

Formally, the expression X(p)=pclcod(M(p),φ(p(p))φExp(PL) is constructed by means of the protocol encoding pclcod: Mod(XL)×Exp(XL)→Exp(PL) based on the protocol interpretation pclint: Sem(NL)→Trm(PL) introduced above. From this metaformal perspective, the internal model M(p)→Mod(XL) appropriate for p is referenced by the term V(P)$_{ENV}$=pclint(c(p),ENV)∈Trm(PL), and semantic objects X(p)$_T$=semrep(q(p)$_T$)∈Sem(NL), which represent distinguished subterms q(p)$_T$=pcltrm(q(p),T)∈Syn(NL) of q(p)=synrep(p)∈Syn(NL) corresponding to metatypes T∈Typ(PL), are interpreted as terms W(P)$_T$=pclint(x(p)$_T$)∈Trm(PL). For the purpose of protocol consistency, it is significant to note that the formal terms from which φ(p)∈Exp(XL) is assembled are simply the interpretations v(p)$_T$=fmltrm(w(p)$_T$)∈Trm(XL).

When PL is XMPL, the formal language associated with the universal protocol XMP, this metasyntactic construction is straightforward. Indeed, the syntax of XMPL is explicitly designed to accommodate MEAO semantics. In general, what is specified by any XMPL expression is an operational environment, a transaction mapping, a mapping domain, a mapping range, and a mapping argument. Refinements to any of these elements are indicated by appropriate nestings of subelements.

Again, in the simplest case conforming to MEAO semantics, X(p)∈Exp(XMPL) is the protocol statement <XMP|<ENV|V(p)|ENV><MAP|f(p)|MAP><DMN|A(p)|DMN><RNG|B(p)|<ARG|X(p)|ARG>|XMP> where <ABC|xyz|ABC> is a term of protocol type ABC and content xyz. The basic types occurring here are XMP=transaction protocol
ENV=operational environment
MAP=transaction mapping
DMN=mapping domain
RNG=mapping range
ARG=mapping argument For example, the XMPL statement which results from a metaformal interpretation of the sample natural language expression being processed is <XMP|<ENV|email|ENV><MAP|send|MAP><DMN|
<ADR|user@here.net|ADR>|DMN>
<RNG|<ADR|bob@there.net|ADR>|RNG>
<ARG|<MSG|<SBT|<LST|Appointment|LST>|SBT>
<TXT|<LST|Are you going to go to your appointment by yourself?|LST>|TXT>|MSG>|ARG>|XMP> using the additional protocol types
- ADR=object address
- MSG=message object
- SBT=message subject
- TXT=message text
- LST=literal string Note that the actual message text field of the XMPL statement consists of a question with the appropriate substitutions of $2^{nd}$ person pronouns for the original $3^{rd}$ person forms referring to the recipient "Bob". These transformations are computed as natural consequences of the syntactic relations coded into the algebraic form of the original natural language expression. In fact, all terms in the XMPL translation are computed similarly, i.e. as significant correlates of objects in the semantic complex structured by the syntactic dependencies indicated by the original natural language expression.

This metaformal syntactic scheme provides an effective universal template for abstract computations, and most significantly, for further translations into exact forms which are executable in specific operational environments.

External Processing: Refer to Module 3.4 of FIG. 3.

External Representation: Refer to Submodule 3.4.1 of FIG. 3.

Contact of the system with specific operational environments is made by means of an external representation extrep: $Mod(XL) \rightarrow Env(NL)$ which associates appropriate external operational environments with internal formal models. In fact, these internal structures are explicitly designed as abstract models of external environments in order to accommodate this representation; accordingly, the external representation extrep may be viewed as the inverse of an internal representation intrep: $Env(NL) \rightarrow Mod(XL)$ arising from a prior analysis of those operational environments which are relevant to the system.

For environments $E \in Env(NL)$ which have their own executable language EL, this representation facilitates a translation between XL and EL by providing the semantic conditions which determine the mapping from terms of XL to the corresponding terms in EL. It is by means of this mediation in terms of its object language XL that the natural language NL, which is appropriate for informal negotiations in a wide variety of environments, becomes a metalanguage for an executable language EL, and therefore provides a basis for a meaningful operational semantics.

External Interpretation: Refer to Submodule 3.4.2 of FIG. 3.

For a specific application in some external operational environment $E \in Env(NL)$ with an associated executable language EL, i.e. an application relative to a structure E for which there is an executable interpretation $expint_E$: $Exp(EL) \rightarrow E$, expressions of the object language XL are translated into expressions of EL by means of an external translation $exttrn_E$: $Exp(XL) \rightarrow Exp(EL)$. The commutative diagram shown in FIG. 7a illustrates the respective roles of the syntactic and semantic algebras for NL and the formal apparatus of XL in determining this translation.

The role of the metasemantic protocol indicated in this diagram is implicit. As an effective implementation of a formal interpretation scheme between NL and XL, it controls a critical aspect of the internal semantics of the system. As an effective translation medium between the internal formal structures of XL and with executable structures of EL associated with any operational environment E for NL, this protocol controls the external semantics of the system. The diagram shown in FIG. 7b illustrates the scope of these dual functions by highlighting the influence of the protocol on the system.

In particular, relative to an external operational environment E $extrep(M) \in Env(NL)$ modeled by an internal structure $M \in Mod(XL)$, the formal translation $exttrn_E$: $Exp(XL) \rightarrow Exp(EL)$ is implemented by means of the protocol encoding pclcod: $Mod(XL) \times Exp(XL) \rightarrow Exp(PL)$ and translation pcltrn: $Exp(PL) \rightarrow Exp(EL)$ as the composition $exttrn_E(\phi) = pcltrn(pclcod(M,\phi))$ for any formal expression $\phi \in Exp(XL)$; moreover, the appropriate operational environment is determined by means of the protocol representation pclrep: $Exp(PL) \rightarrow Env(NL)$ as $E = pclrep(pclcod(M,\phi))$. In short, all external transactions are mediated by the protocol.

Indeed, the universal transaction protocol XMP easily accommodates externalization since its associated formal language XMPL naturally translates into executable languages such as SQL (Standard Query Language) and SMTPL (the language of the mail protocol SMTP), and even executable extensions of XML (eXtensible Markup Language), in the manner indicated above, where EL is any of these executable languages. As such, XMPL forms a natural bridge between the internal semantics of the system and the external semantics of the environments in which it operates. The control structure of XMP then makes these external translations effective by finally facilitating in appropriate operational environments the execution of commands originally issued by the user in natural language.

More precisely, as given in the simple machine interpretable form

<XMP|<ENV|V|ENV><MAP|f|MAP><DMN|A|DMN>
<RNG|B|RNG><ARG|x|ARG>|XMP> introduced above, a basic protocol statement $X \in Exp(XMPL)$ encodes the instruction to execute in environment E the operation $f_E$ with domain $A_E$ and range $B_E$ on the argument $x_E$, where the external elements a) $E = extref(X, ENV) = pclrep(X) \in Env(NL)$
b) $f_E = extref(X, MAP) = modref_E(extint_E(f)) \in Map(E)$
c) $A_E = extref(X, DMN) = modref_E(extint_E(A)) \in Obj(E)$
d) $B_E = extref(X, RNG) = modref_E(extint_E(B)) \in Obj(E)$
e) $X_E = extref(X, ARG) = modref_E(extint_E(x)) \in A_E$ are properly interpreted by means of the uniform external reference extref: $Exp(PL) \times Trm(PL) \rightarrow Env^*(NL)$, or alternatively, initialized by the protocol representation pclrep $Exp(PL) \rightarrow Env(NL)$, and then determined locally by the composition of the model reference $modref_E$: $Trm(EL) \rightarrow E$ with the external term interpretation $extint_E$: $Trm(PL) \rightarrow Trm(EL)$, both of which are defined relative to the operational environment $E \in Env(NL)$. The actual external processing of this instruction is finally accomplished by application of the execution process $envexc_E$: $Exp(EL) \rightarrow E$ to the formal translate $\xi = pcltrn(X) \in Exp(EL)$, which is the executable expression encoded in X and constructed over the terms $extint_E(f)$, $extint_E(A)$, $extint_E(B)$, $extint_E(x) \in Trm(EL)$. The result is a new state $envexc_E(\xi) \in E$.

For example, when interpreted according to its explicit formal specification as an email instruction to be executed under the control of the external protocol SMTP, the XMPL statement resulting from the sample expression being processed yields the result To: Bob
From: <user>
Subject: Appointment
Text: Are you going to go to your appointment by yourself?

as a properly formatted message in the file bob@there.net, where <user> is the local (recipient's) identification of the sender (user).

Applications and Technology:

METASCRIPT is currently implemented as a translation from a natural language (English) into the formal language (XMPL) associated with a universal transaction protocol (XMP: eXternal Media Protocol). In turn, this formal language is suitable for interpretation by digital components in external operational environments into executable machine instructions. Thus METASCRIPT allows a human user to communicate naturally in an effective manner with (and through) any programmable device, hence networked configurations of such devices, compatible with the protocol XMP. In this capacity, METASCRIPT is a natural language interface to any sufficiently capable digital environment, whether it be a single device such as a computer, a cellular phone, a PDA (Personal Digital Assistant), a kitchen appliance, an automobile, or a whole network of such devices such as a local intranet or the global Internet. As a complete NLP system, the combined technologies of METASCRIPT and XMP enable a seamless integration of all participants, human and digital alike, into an effective ubiquitous network.

The fundamental algorithm upon which METASCRIPT is based employs a reduction to formal syntactic structures over terms defined in an extensible lexicon. This term reduction incorporates both syntactic type and semantic context to achieve an effective formal representation and interpretation of the meaning conveyed by any natural language expression. Extensibility of the lexicon under specific user direction provides the capacity for the system to expand its knowledge of vocabulary and usage, and consequently, offers an effective mechanism under user control for establishing definite incremental enhancements to the system's linguistic capabilities, hence substantially increasing the system's familiarity with (and competence in) particular operational environments.

In addition, the system automatically gains functional complexity through its object-oriented semantics, whereby the addition of formal terms having composite objects generated by algebraic representations of natural linguistic terms as direct references permits unlimited efficiency and sophistication of machine comprehensible natural language usage. Put simply, the system learns as it goes. Moreover, any desired level of syntactic disambiguation is attainable by increasing the local dimensionality of the underlying reduction matrix, though this feature is part of the underlying algorithm, and therefore independent of user modulation.

Finally, while the invention has been particularly shown and described with reference to preferred embodiments thereof, it will be understood by those skilled in the art that various changes in form and details may be made therein without departing from the spirit and scope of the invention.

I claim:

1. A natural language processing apparatus for translating natural language into a formal language executable on a programmable device, said system comprising,
    a) memory for storing data;
    b) a data processor;
    c) an input device for presenting natural language text to said system:
    d) a text parser for partitioning said text into a sequence of sequences of strings of characters or pretokens;
    e) a lexicon for storing lexical terms as token associated with lexical type and reference data;
    f) a lexical type assignment process for assigning lexical types to pretokens by comparison to terms in the lexicon;
    g) a lexical insertion processor for inserting terms into the lexicon under specific control;
    h) a control processor for invoking lexical insertions under the condition that a pretoken is not recognized as a lexical token;
    i) a type contextualization processor by which refined lexical types may be reassigned to tokens depending on syntactic context;
    j) a type reduction matrix;
    k) a term reduction processor which uses said type reduction matrix to determine proper syntactic dependencies between tokens in a sentence;
    l) a term inversion processor for constructing chains of syntactic dependencies among lexical terms in an expression and for determining proper dependencies between those chains;
    m) a syntactic tree generation processor for constructing syntactic trees representing the syntactic structure of each expression processed by the processors;
    n) a syntactic algebra comprising syntactic terms formally representing processed expressions;
    o) a syntactic representation processor for constructing syntactic terms to represent formal syntactic structures of processed expressions;
    p) a semantic algebra comprising semantic objects as formal references of appropriate terms in the syntactic algebra;
    q) a semantic representation processor for associating internal semantic object references with terms in the syntactic algebra;
    r) a semantic tensor algebra comprising correlated pairs of syntactic algebraic terms and their semantic object representations;
    s) a formal representation processor for associating appropriate internal formal models with terms in the semantic tensor algebra;
    t) a formal interpretation processor for transforming terms in the syntactic algebra into equivalent expressions in an internal formal language;
    u) an external representation processor for associating external operational environments with internal formal models;
    v) an external interpretation processor for translating expressions in an internal formal language into equivalent formal expressions executable into appropriate external operational environments.

2. A method for translating natural language into a formal language executable on a programmable device, said method comprising the steps of:
    a) receiving natural language text;
    b) parsing said text into a sequences of sequences of pretokens;
    c) recognizing pretokens as tokens in the lexicon;
    b) parsing said text into a sequence of sequences of pretokens;
    c) recognizing pretokens as tokens in the lexicon;
    d) inserting new terms into the lexicon under specific control;
    e) assigning types to pretokens to form lexical terms for further syntactic processing;
    f) reassigning lexical types to tokens based on syntactic context;

g) correlating terms occurring in a set of expressions in order to replace indirect references by appropriate direct references;
h) establishing syntactic dependencies between terms in an expression through a process of term reduction;
i) constructing chains of syntactic dependencies and determining dependencies between those chains, by a process of term inversion;
j) generating syntactic trees which represent the syntactic structures of processed expressions;
k) representing said processed expressions as terms in a syntactic algebra;
l) representing terms in the syntactic algebra as objects in a semantic algebra;
m) combing objects in the semantic algebra by means of a semantic product on pairs of semantic objects to form more complex semantic objects;
n) representing correlated syntactic algebraic terms and semantic objects as terms in a semantic tensor algebra;
o) representing terms in the semantic tensor algebra as internal formal models;
p) transforming terms in the syntactic algebra into equivalent expressions in an internal formal language,
q) associating external operation environments with internal formal models; and
p) translating expressions of the internal formal language into equivalent formal expressions executable in an external operational environment.

3. In a natural language processing apparatus for translating natural language into a formal language executable on a programmable device, wherein said apparatus includes processing means; input means for presenting natural language text to said system;
a lexicon of terms; a text parser which partitions expressions into sequences of sequences of pretokens;
a type assignment process for assigning syntactic types to pretokens by comparison to lexical terms in the lexicon and determining their status as tokens;
a type contextualization process for reassigning lexical types to tokens based on syntactic context,
a term correlation process for correlating terms occurring in a set of expressions in order to replace indirect references by direct references, said system comprising
a) a type reduction matrix;
b) a term reduction processor that uses the type reduction matrix to determine proper syntactic dependencies between tokens in an expression;
c) a term inversion processor for constructing chains of syntactic dependencies among lexical terms in an expression and for determining the proper dependencies between those chains;
d) a syntactic tree generation processor for constructing syntactic trees representing syntactic structures of expressions;
e) a syntactic algebra comprising syntactic terms formally representing processed expressions;
f) a syntactic representation processor for constructing syntactic algebraic terms representing processed expressions;
g) a semantic object algebra comprising semantic objects as internal references of terms in the syntactic algebra;
h) a semantic product processor by which objects in the in the semantic object algebra are combined to form more complex semantic objects;
i) a semantic representation processor by which internal semantic algebraic objects representing terms in the syntactic algebra are constructed;
j) a semantic tensor algebra comprising correlated syntactic terms and semantic objects;
k) a formal representation processor by which internal formal models are associated with terms in the semantic tensor algebra;
l) a formal interpretation processor by which syntactic algebraic terms are transformed into equivalent expressions in an internal formal language;
m) a semantic product processor by which objects in semantic algebra are combined to form more complex semantic objects;
n) an external representation processor by which external operational environments are associated with internal formal models; and
o) an external interpretation processor by which expressions in an internal formal language are translated into equivalent formal expressions executable in an external environment.

4. A software system for translating natural language into a formal language executable on a programmable device,
wherein said system includes processing means; input means for presenting natural language text to said system; a lexicon of terms; a text parser which partitions natural language texts into sequences of sequences of pretokens; a type assignment process for assigning syntactic types to pretokens by comparison to lexical terms in the lexicon and determining their status as tokens;
a type contextualization process for reassigning lexical types to tokens based on syntactic context;
a term correlation process for correlating terms occurring in a set of expressions in order to replace indirect references by direct references,
a) a type reduction matrix;
b) a term reduction process which uses the reduction matrix to determine proper syntactic dependencies between tokens in an expression;
c) a term inversion process for constructing chains of syntactic dependencies among lexical terms in an expression and for determining the proper dependencies between those chains;
d) a syntactic tree generation process by which syntactic trees representing syntactic structures of expressions are constructed;
e) a syntactic algebra comprising syntactic terms formally representing processed expressions;
f) a syntactic representation process by which syntactic algebraic terms representing processed expressions are constructed;
g) a semantic object algebra comprising semantic objects as internal references of term in the syntactic algebra;
h) a semantic object algebra comprising semantic objects as formal references of terms in the syntactic algebra;
i) a semantic representation process by which internal semantic algebraic objects representing appropriate terms in the syntactic algebra are constructed;
j) a semantic product process by which objects in the semantic algebra are combined to form more complex semantic objects;
k) a formal representation process by which internal formal models object references are associated with terms in semantic tensor algebra;
l) a formal interpretation process by which syntactic algebraic terms are transformed into equivalent expressions in an internal formal language;

m) an external representation process by which appropriate external operation environments are associated with internal formal models; and n) an external interpretation process by which expressions in an internal formal language are translated into equivalent formal expressions executable in an external operational environment.

5. A software system for a data processing device used in translating natural language into executable expressions in a formal language, wherein said data processing device includes a data processor and memory;

input means for presenting natural language text to said system; a lexicon of terms; a text parser which partitions natural language texts into sequences of sequences of pretokens;

a type assignment processor for assigning syntactic types to pretokens by comparison to lexical terms in the lexicon and determining their status as tokens;

a type contextualization processor for reassigning lexical types to tokens based on syntactic context;

a term correlation processor for correlating terms occurring in a set of expressions in order to replace indirect references by direct references; said software system comprising, a) a type reduction matrix for processing said expressions;

b) a term reduction processor that uses the type reduction matrix to determine proper syntactic dependencies between tokens in an expression;

c) a term inversion processor for constructing chains of syntactic dependencies among lexical terms in an expression and for determining the proper dependencies between those chains;

d) a syntactic tree generation processor by which syntactic trees representing syntactic structures of expressions are constructed;

e) a syntactic algebra comprising syntactic terms formally representing said processed expressions;

f) a syntactic representation processor by means of which syntactic algebraic terms representing processed expressions are constructed;

g) a semantic object algebra comprising semantic objects as internal references of terms in the syntactic algebra;

h) a semantic representation processor by which internal semantic algebraic objects representing terms in the syntactic algebra are constructed;

i) a semantic product processor by which objects in semantic algebra are combined to form more complex semantic objects;

j) a formal representation processor by which internal formal models are associated with terms in semantic tensor algebra;

k) a formal interpretation processor by which syntactic algebraic terms are transformed into equivalent expressions in an internal formal language;

l) an external representation processor by which external operational environments are associated with internal formal models; and m) an external interpretation processor by which expressions in an internal formal language are translated into equivalent formal expressions executable in an external operational environment.

6. A system as in claim 5 further including a protocol for connecting an output of said translating processor to digitally responsive machines and other data responsive devices.

7. A system as in claim 5 further including a protocol by means of which a-2) selected ones of said internal formal models are associated with terms in said semantic tensor algebra;

b-2) syntactic algebraic terms are transformed into equivalent expressions in the internal formal language;

c-2) selected external operational environments are associated with selected formal models; and d-2) expressions in the internal formal language are translated into equivalent formal expressions executable in an external operational environment.

8. A system as in claim 5 further comprising, a-3) a lexical insertion processor for inserting lexical terms into the lexicon under user control whereby said lexicon can be expanded and refined; and b-3) a controller for invoking lexical insertions under the condition that a pretoken is not recognized as a lexical token.

9. A system as in claim 7 further including a process control for inserting external lexical information to said lexicon to enable the system to learn new lexical information including vocabulary and associated lexical type and reference relations.

* * * * *